(12) United States Patent
Chandail et al.

(10) Patent No.: US 10,794,983 B1
(45) Date of Patent: Oct. 6, 2020

(54) ENHANCING THE ACCURACY OF ANGLE-OF-ARRIVAL DEVICE LOCATING THROUGH MACHINE LEARNING

(71) Applicant: Cisco Technology, Inc., San Jose, CA (US)

(72) Inventors: Mukul Chandail, North Royalton, OH (US); Khashayar Mirfakhraei, Los Altos, CA (US); Matthew Aaron Silverman, Shaker Heights, OH (US); Xu Zhang, Fremont, CA (US); Zhigang Gao, Twinsburg, OH (US); Paul Jeffrey Stager, Akron, OH (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/521,860

(22) Filed: Jul. 25, 2019

(51) Int. Cl.
| | |
|---|---|
| *H04W 24/02* | (2009.01) |
| *G01S 3/32* | (2006.01) |
| *G01S 11/04* | (2006.01) |
| *G01S 11/06* | (2006.01) |
| *H04W 4/029* | (2018.01) |
| *H04W 64/00* | (2009.01) |

(Continued)

(52) U.S. Cl.
CPC .............. *G01S 3/325* (2013.01); *G01S 11/04* (2013.01); *G01S 11/06* (2013.01); *G06N 20/00* (2019.01); *H04W 4/029* (2018.02); *H04W 64/006* (2013.01); *G01S 5/0215* (2013.01)

(58) Field of Classification Search
CPC ...... H04W 8/005; H04W 4/023; H04W 24/02
USPC ...................................................... 455/456.3
See application file for complete search history.

(56) References Cited

U.S. PATENT DOCUMENTS

| | | | |
|---|---|---|---|
| 9,297,723 B1 * | 3/2016 | Hofmann | G01M 99/00 |
| 9,310,461 B2 | 4/2016 | Pandey | |
| 9,648,615 B2 | 5/2017 | Joshi et al. | |

(Continued)

FOREIGN PATENT DOCUMENTS

CN            105101408 B        10/2018

OTHER PUBLICATIONS

Junhai Luo et al., "A smartphone indoor localization algorithm based on WLAN location fingerprinting with feature extraction and clustering," https://res.mdpi.com/sensors/sensors-17-01339/article_deploy/sensors-17-01339.pdf?filename=&attachment=1, May 4, 2017.

(Continued)

*Primary Examiner* — William D Cumming
(74) *Attorney, Agent, or Firm* — Behmke Innovation Group LLC; James M. Behmke; Jonathon P. Western

(57) ABSTRACT

In one embodiment, a device obtains a machine learning model indicative of how to focus on particular location information from a plurality of radio frequency (RF) elements to provide an accurate location estimate of a wireless client based at least in part on angle-of-arrival information of the wireless client. When the device then obtains location information regarding the wireless client from the plurality of RF elements, it may apply the machine learning model to the location information regarding the wireless client to focus on particular location information of the location information from the plurality of RF elements. The device may then estimate a physical location of the wireless client based on focusing on the particular location information during a locationing computation.

14 Claims, 19 Drawing Sheets

(51) Int. Cl.
*G06N 20/00* (2019.01)
*G01S 5/02* (2010.01)

(56) References Cited

U.S. PATENT DOCUMENTS

| | | | |
|---|---|---|---|
| 9,823,330 | B2 | 11/2017 | Hart et al. |
| 9,990,822 | B2* | 6/2018 | Emmanuel .............. H04L 5/003 |
| 10,588,110 | B2* | 3/2020 | Mukherji .............. H04W 24/02 |
| 10,595,165 | B2 | 3/2020 | Zhang et al. |
| 2007/0197262 | A1 | 8/2007 | Smith et al. |
| 2011/0221635 | A1* | 9/2011 | Wang ..................... G01S 5/0242 342/463 |
| 2013/0267251 | A1* | 10/2013 | Khorashadi ........... H04W 4/023 455/456.3 |
| 2014/0099971 | A1 | 4/2014 | Lim et al. |
| 2016/0018507 | A1 | 1/2016 | Chen et al. |
| 2017/0111781 | A1* | 4/2017 | Zhu ....................... H04W 8/005 |
| 2018/0053401 | A1* | 2/2018 | Martin ................. G08B 29/188 |
| 2018/0102032 | A1* | 4/2018 | Emmanuel .............. H04L 67/42 |
| 2018/0167783 | A1* | 6/2018 | Khoche .................. B32B 37/06 |
| 2019/0266501 | A1* | 8/2019 | Tavares ................. G01V 99/005 |
| 2019/0272458 | A1* | 9/2019 | Khoche .................. B32B 37/12 |
| 2019/0316924 | A1* | 10/2019 | Morgan-Brown .......................... G01C 21/3676 |
| 2020/0015189 | A1* | 1/2020 | Mukherji .............. G06K 9/6256 |
| 2020/0049837 | A1* | 2/2020 | Werner .................. G01S 19/48 |
| 2020/0074360 | A1* | 3/2020 | Humphries .............. G06F 21/56 |

OTHER PUBLICATIONS

Y. Cheng et al., "Machine-Learning Indoor Localization with Access Point Selection and Signal Strength Reconstruction," 2016 IEEE 83rd Vehicular Technology Conference (VTC Spring), Nanjing, 2016, pp. 1-5.

Yiqiang Chen et al., "Power-efficient access-point selection for indoor location estimation," in IEEE Transactions on Knowledge and Data Engineering, vol. 18, No. 7, pp. 877-888, Jul. 2006.

T. Van Nguyen et al., "Machine Learning for Wideband Localization," in IEEE Journal on Selected Areas in Communications, vol. 33, No. 7, pp. 1357-1380, Jul. 2015.

Manikanta Kotaru et al., "SpotFi: Decimeter Level Localization Using WiFi", SIGCOMM '15: Proceedings of the 2015 ACM Conference on Special Interest Group on Data Communication, Aug. 2015 pp. 269-282, https://doi.org/10.1145/2785956.2787487.

C. Koweerawong et al., "Indoor localization improvement via adaptive RSS fingerprinting database," the International Conference on Information Networking 2013 (ICOIN), Bangkok, 2013, pp. 412-416.

Song, C.et al., "WLAN Fingerprint Indoor Positioning Strategy Based on Implicit Crowdsourcing and Semi-Supervised Learning", ISPRS Int. J. Geo-Inf. 2017, 6, 356.

Roos, Teemu et al., "A Probabilistic Approach to WLAN User Location Estimation", International Journal of Wireless Information Network, vol. 9, No. 3, Jul. 2002, 155-164.

Suyash Gupta, "Wi-Fi- based Indoor Positioning System Using Smartphones", Talentica Software India Pvt. Ltd., https://www.talentica.com/assets/white-papers/wifi-indoor-positioning-using-smartphones.pdf, 2018, printed Mar. 31, 2020, 23 pages.

Xuyu Wang et al., "CiFi: Deep Convolutional Neural Networks for Indoor Localization with 5GHz Wi-Fi", May 2017, Proc. IEEE ICC 2017, 6 pages.

Xuyu Wang et al., "CSI-based Fingerprinting for Indoor Localization: A Deep Learning Approach", IEEE Transactions on Vehicular Technology, Mar. 23, 2016, 14 pages.

Vivienne SZE et al., "Efficient Processing of Deep Neural Networks: A Tutorial and Survey", https://arxiv.org/pdf/1703.09039.pdf, Aug. 13, 2017, 32 pages.

M. Gilli et al., "A note on 'good starting vvalues' in numerical optimisation", Comisef Working Papers Series, Jun. 3, 2010, http://comisef.eu/files/wps044.pdf, 8 pages.

* cited by examiner

FIG. 11

TRAINING CONFUSION MATRIX (1110)

| Output Class | Target Class 0 | Target Class 1 | |
|---|---|---|---|
| 0 | 672 / 73.8% ✓ | 68 / 7.5% ✗ | 90.8% ✓ / 9.2% ✗ |
| 1 | 22 / 2.4% ✗ | 148 / 16.3% ✓ | 87.1% ✓ / 12.9% ✗ |
| | 96.8% ✓ / 3.2% ✗ | 68.5% ✓ / 31.5% ✗ | 90.1% ✓ / 9.9% ✗ |

VALIDATION CONFUSION MATRIX (1120)

| Output Class | Target Class 0 | Target Class 1 | |
|---|---|---|---|
| 0 | 141 / 72.3% ✓ | 14 / 7.2% ✗ | 91.0% ✓ / 9.0% ✗ |
| 1 | 13 / 6.7% ✗ | 27 / 13.8% ✓ | 67.5% ✓ / 32.5% ✗ |
| | 91.6% ✓ / 8.4% ✗ | 65.9% ✓ / 34.1% ✗ | 86.2% ✓ / 13.8% ✗ |

TEST CONFUSION MATRIX (1130)

| Output Class | Target Class 0 | Target Class 1 | |
|---|---|---|---|
| 0 | 143 / 73.3% ✓ | 22 / 11.3% ✗ | 86.7% ✓ / 13.3% ✗ |
| 1 | 9 / 4.6% ✗ | 21 / 10.8% ✓ | 70.0% ✓ / 30.0% ✗ |
| | 94.1% ✓ / 5.9% ✗ | 48.8% ✓ / 51.2% ✗ | 84.1% ✓ / 15.9% ✗ |

ALL CONFUSION MATRIX (1140)

| Output Class | Target Class 0 | Target Class 1 | |
|---|---|---|---|
| 0 | 956 / 73.5% ✓ | 104 / 8.0% ✗ | 90.2% ✓ / 9.8% ✗ |
| 1 | 44 / 3.4% ✗ | 196 / 15.1% ✓ | 81.7% ✓ / 18.3% ✗ |
| | 95.6% ✓ / 4.4% ✗ | 65.3% ✓ / 34.7% ✗ | 88.6% ✓ / 11.4% ✗ |

ENHANCING THE ACCURACY OF ANGLE-OF-ARRIVAL DEVICE LOCATING THROUGH MACHINE LEARNING

TECHNICAL FIELD

The present disclosure relates generally to computer networks, and, more particularly, to enhancing the accuracy of angle-of-arrival device locating through machine learning.

BACKGROUND

In wireless communication applications, it is desirable to locate various wireless devices, such as wireless client devices operating in a wireless local area network. In current location solutions, multiple access points (APs), typically with multiple antennas, contribute to estimating the XY location of a device. However, not all of the APs or antennas contribute to the solution equally, and in fact, some can contribute in a way that actually degrades location accuracy.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 11 illustrates an example confusion matrix for training, validation, and testing sets;

DESCRIPTION OF EXAMPLE EMBODIMENTS

Overview

Figure 1:
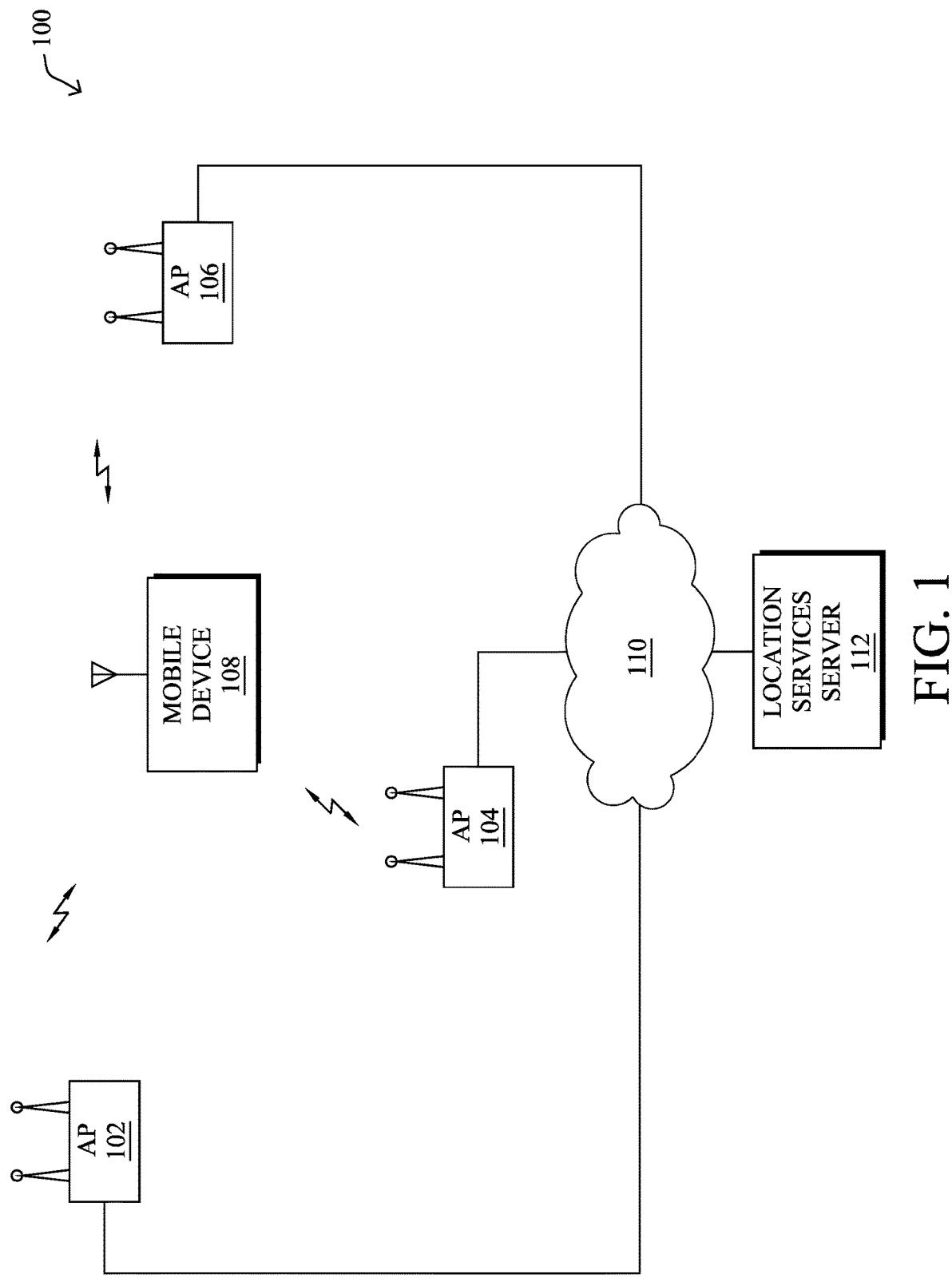
FIG. 1 illustrates an example communication network.

According to one or more embodiments of the disclosure, a device obtains a machine learning model indicative of how to focus on particular location information from a plurality of radio frequency (RF) elements to provide an accurate location estimate of a wireless client based at least in part on angle-of-arrival information of the wireless client. When the device then obtains location information regarding the wireless client from the plurality of RF elements, it may apply the machine learning model to the location information regarding the wireless client to focus on particular location information of the location information from the plurality of RF elements. The device may then estimate a physical location of the wireless client based on focusing on the particular location information during a locationing computation.

In one embodiment, the RF elements comprise access points, and in one embodiment, the location information comprises locational probability heatmaps. In one embodiment, focusing on the particular location information during a locationing computation comprises excluding location information from certain access points.

In another embodiment, the RF elements comprise antennas of access points, and in one embodiment, focusing on the particular location information during a locationing computation comprises weighting location information from certain antennas of certain access points to define a level of influence of the location information from certain antennas to the locationing computation.

Other embodiments are described below, and this overview is not meant to limit the scope of the present disclosure.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus, and are typically implemented using Ethernet connections or wireless technologies, such as IEEE 802.11, Wi-Fi®, or others. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC), and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

FIG. 1 illustrates a block diagram of a simplified wireless computer network 100 upon which an example embodiment may be implemented. For example, access points (APs) 102, 104, 106 may send and receive signals to and from mobile device 108 on one or more antennas, where the signals may be carrying various types of data or messages as will be readily understood by those skilled in the art. As described below, APs 102,104, and 106 may be configured to measure a signal parameter such as signal strength (for example received signal strength indication or "RSSI") as well as an angle-of-arrival (AoA) of a received signal and forward the measurements via network 110 (e.g., a wireless LAN) to location services server 112.

In the illustrated example, location services server 112 is a standalone device but those skilled in the art should readily appreciate that location services server 112 may be embodied in any suitable infrastructure node. For example, location services server 112 may be embodied in one of APs 102, 104, and/or 106. In an example embodiment, APs 102, 104, and 106 may also send additional data such as antenna type, antenna gain, antenna orientation, etc. to location services server 112. In an example embodiment, location services server 112 may then attempt to determine an estimated location for mobile device 108 based on the measured signal strengths (e.g., based on an a priori transmit power for the wireless device) and/or the angles-of-arrival from each of the APs.

In the preceding example, measurements from three receiving devices (APs 102, 104, and 106 in the illustrated example) were employed to determine the location of wireless device 108. The number of APs chosen for this example was merely for ease of illustration as those skilled in the art should readily appreciate that the principles set forth herein can be applied to any physically realizable number of receiving devices. Additionally, in other embodiments other signal parameters may be employed to provide the initial location estimate. For example, APs 102, 104, and 106 may measure time of arrival (ToA) and location services server 112 determines from time difference of arrival (TDOA) an initial estimated location. Furthermore, in some embodiments, the techniques herein may be applied to other network topologies and configurations. For example, the techniques herein may be applied to cellular technologies, BLUETOOTH® technologies, and so on, data centers, etc.

Moreover, in various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Figure 2:
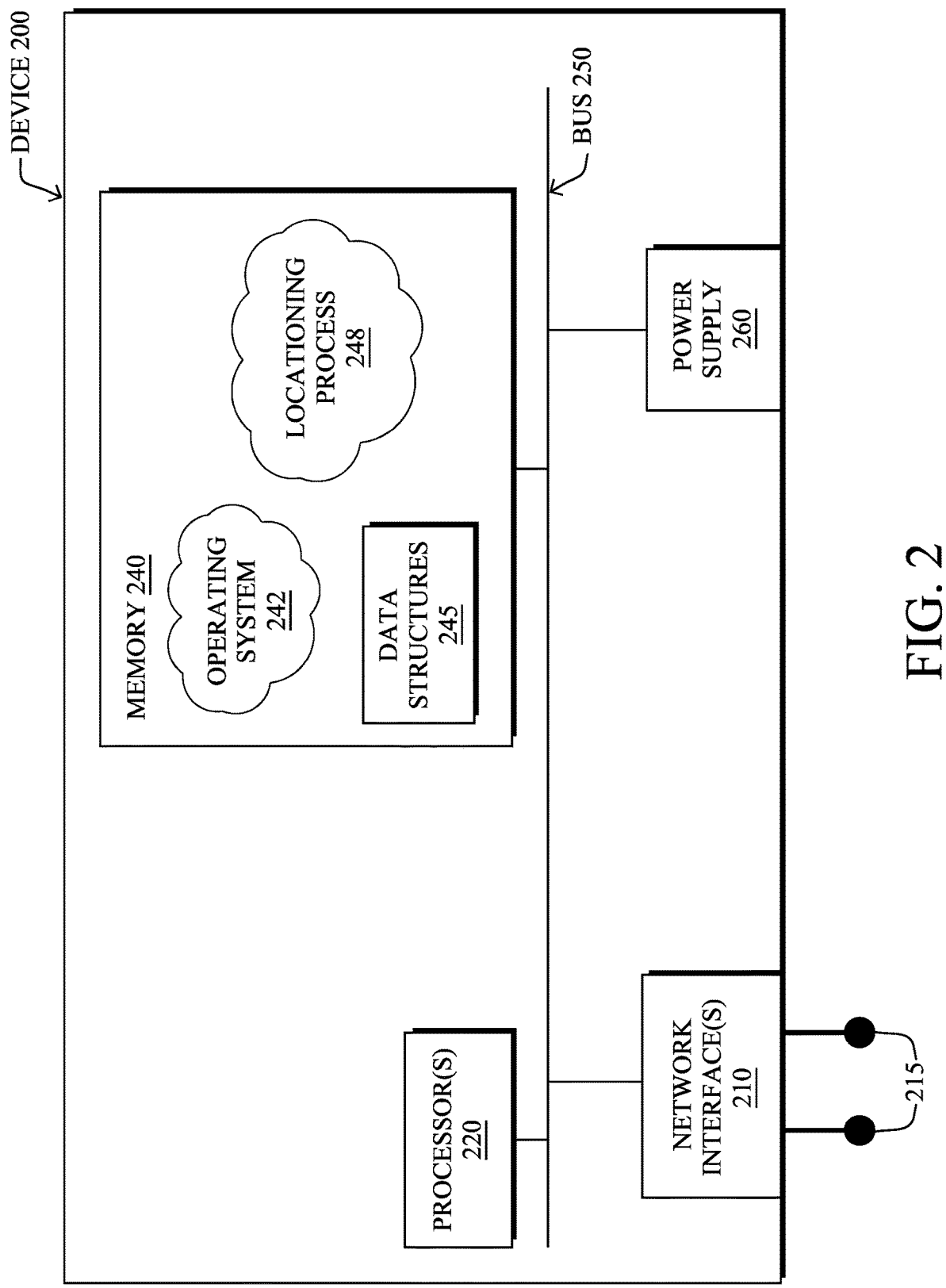
FIG. 2 illustrates an example network device/node.

FIG. 2 is a schematic block diagram of an example node/device 200 that may be used with one or more embodiments described herein, e.g., as any of the computing devices shown in FIG. 1, particularly the location services server 112, or in certain embodiments, an AP 102, 104, and/or 106 or any other computing device that supports the operations of the techniques herein. The device 200 may also be any other suitable type of device depending upon the type of network architecture in place, such as IoT field area routers (FARs), BLUETOOTH® receivers, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art. Network interfaces 210, particularly on APs, may also have one or more antennas 215, and a multi-antenna AP may be based on each interface having a plurality of antennas, or having a plurality of network interfaces with a respective antenna, or both.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, among other things, invoking network operations in support of software processors and/or services executing on the device. These software processors and/or services may comprise various functional processes, such as routing processes, and illustratively, a "locationing" process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In various embodiments described below, locationing process 248 may utilize machine learning techniques to perform various portions of the techniques herein. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

Computational entities that rely on one or more machine learning techniques to perform a task for which they have not been explicitly programmed to perform are typically referred to as learning machines. In particular, learning machines are capable of adjusting their behavior to their environment. For example, a learning machine may dynamically make future predictions based on current or prior network measurements, may make control decisions based on the effects of prior control commands, etc.

For purposes of the techniques herein, a learning machine may construct a model (e.g., a supervised, un-supervised, or semi-supervised model) for use with the locationing services when determining approximate locations of mobile devices. Example machine learning techniques that may be used to construct and analyze such a model may include, but are not limited to, nearest neighbor (NN) techniques (e.g., k-NN models, replicator NN models, etc.), statistical techniques (e.g., Bayesian networks, etc.), clustering techniques (e.g., k-means, etc.), neural networks (e.g., reservoir networks, artificial neural networks, etc.), support vector machines (SVMs), or the like.

—Enhancing the Accuracy of Device Locating Through Machine Learning—

As noted above, in wireless communication applications, it is desirable to locate various wireless devices, such as wireless client devices 108 operating in a wireless local area network 100. In current location solutions, multiple APs, typically with multiple antennas, contribute to estimating the XY location of a device. However, not all of the APs or antennas contribute to the solution equally, and in fact, some can contribute in a way that actually degrades location accuracy.

As one example, "hyper-location" is a technology that takes multiple APs grouped to generate an Angle-of-Arrival (AoA)/RSSI heatmap to locate a client device. Hyperlocation is an enhanced location solution that takes advantage of specialized hardware that is available on certain APs, such as the Aironet 4800 Series wireless Access Points available from Cisco Systems, Inc., of San Jose, Calif. Hyper-location uses Angle-of-Arrival of Wi-Fi signals to determine the location of connected mobile devices in manner that can track locations to within three meters in an optimized deployment, while technologies that are using RSSI only can only estimate a location to within 10 meters of accuracy.

Figure 3:
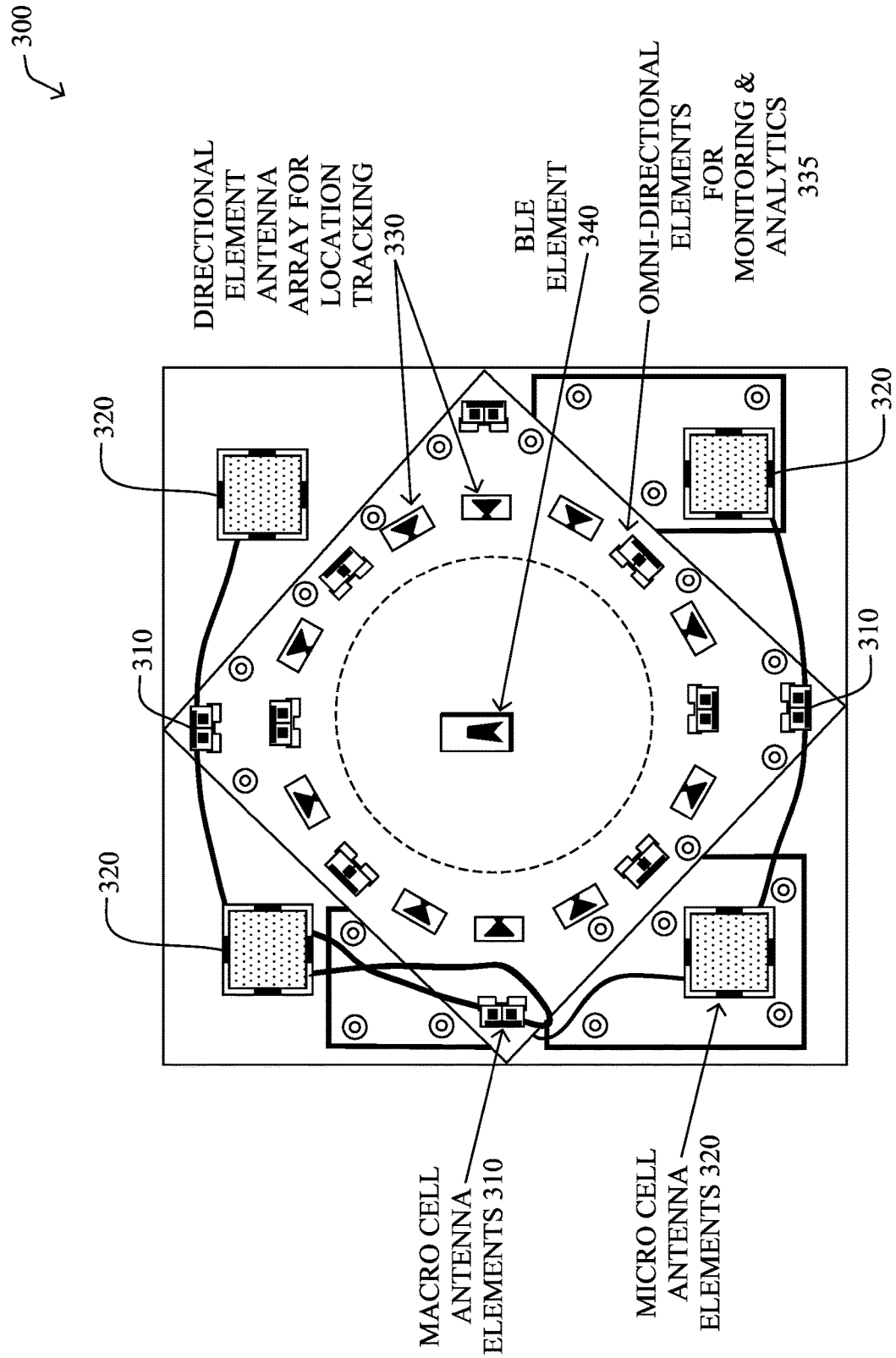
FIG. 3 illustrates an example angle-of-arrival locationing antenna array of an access point.

An illustrative "Hyperlocation" antenna array of an AP 300 is shown in FIG. 3, though any suitable number and arrangement of antennas may be used to achieve locationing based on radio frequency (RF) angle-of-arrival (AoA). For instance, the antenna array 300 illustratively comprises a circular antenna array with a 16-element antenna design that provides 360-degree coverage around an access point. In detail, there are four macro-cell elements 310 (e.g., 2.4/5 GHz) and four micro-cell elements 320 (e.g., 5 GHz) for client connectivity, while sixteen elements 330 (directional) are arranged in a circular antenna array for hyperlocation. (In one embodiment, four elements 335 of the array of elements 330 may be used as an omnidirectional antenna for monitoring.) In one embodiment, other antennas, such as a BLUETOOTH® Low Energy (BLE) antenna 340 in the center, may also be located on the access point, as needed.

Using this example locationing-based AP arrangement, when locating a client device, signals of this client may be received by the sixteen antennas 330 of multiple APs 300, where each antenna at every AP has an RSSI value and a phase value. (That is, when looking across the sixteen antennas at an AP, there is a 1-by-16 angle-of-arrival phase vector.) These RSSI and AoA phase values may then be matched to those computed by theoretical models in order to derive a location of the client/mobile device 108. For example, for AoA calculation as illustrated in environment 400 of FIG. 4, based on geometry (AoA location with three APs, "AP1", "AP2", and "AP3") where the locationing process 248 can compute the ideal phase vector 410 from each AP to the mobile/client device 108 to be:

$$[\exp(j*theta1), \exp(j*theta2), \ldots, \exp(j*theta16)] \quad \text{(Eq. 1)},$$

corresponding to the sixteen antennas on any AP, for any given locations within an area (a "map"). If the actual phase vector of the received signals (for the same sixteen antennas on the same AP) is:

$$[\exp(j*phi1), \exp(j*phi2), \ldots, \exp(j*phi16)] \quad \text{(Eq. 2)},$$

then a correlation can be computed as:

$$C=[\exp(j*theta1), \exp(j*theta2), \ldots, \exp(j*theta16)]*([\exp(j*phi1), \exp(j*phi2), \ldots, \exp(j*phi16)])\hat{}H \quad \text{(Eq. 3)}.$$

This may be repeated for each location on the map, generating a heat map for every AP of probable locations of the client, through which adding together the heatmaps of all grouped APs is used to locate the client.

Figure 5:
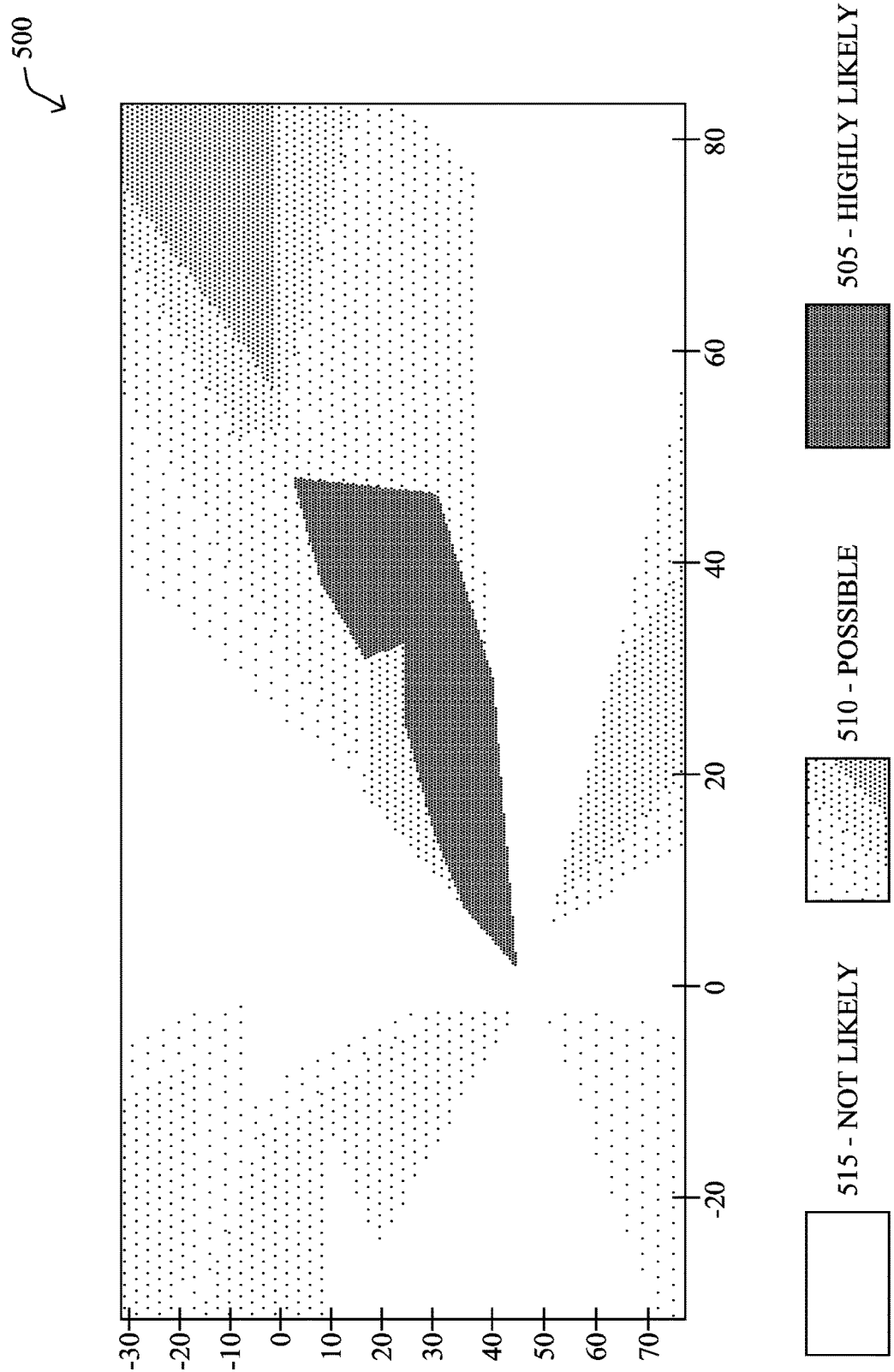
FIG. 5 illustrates an example probability heatmap for device location.
Figure 6:
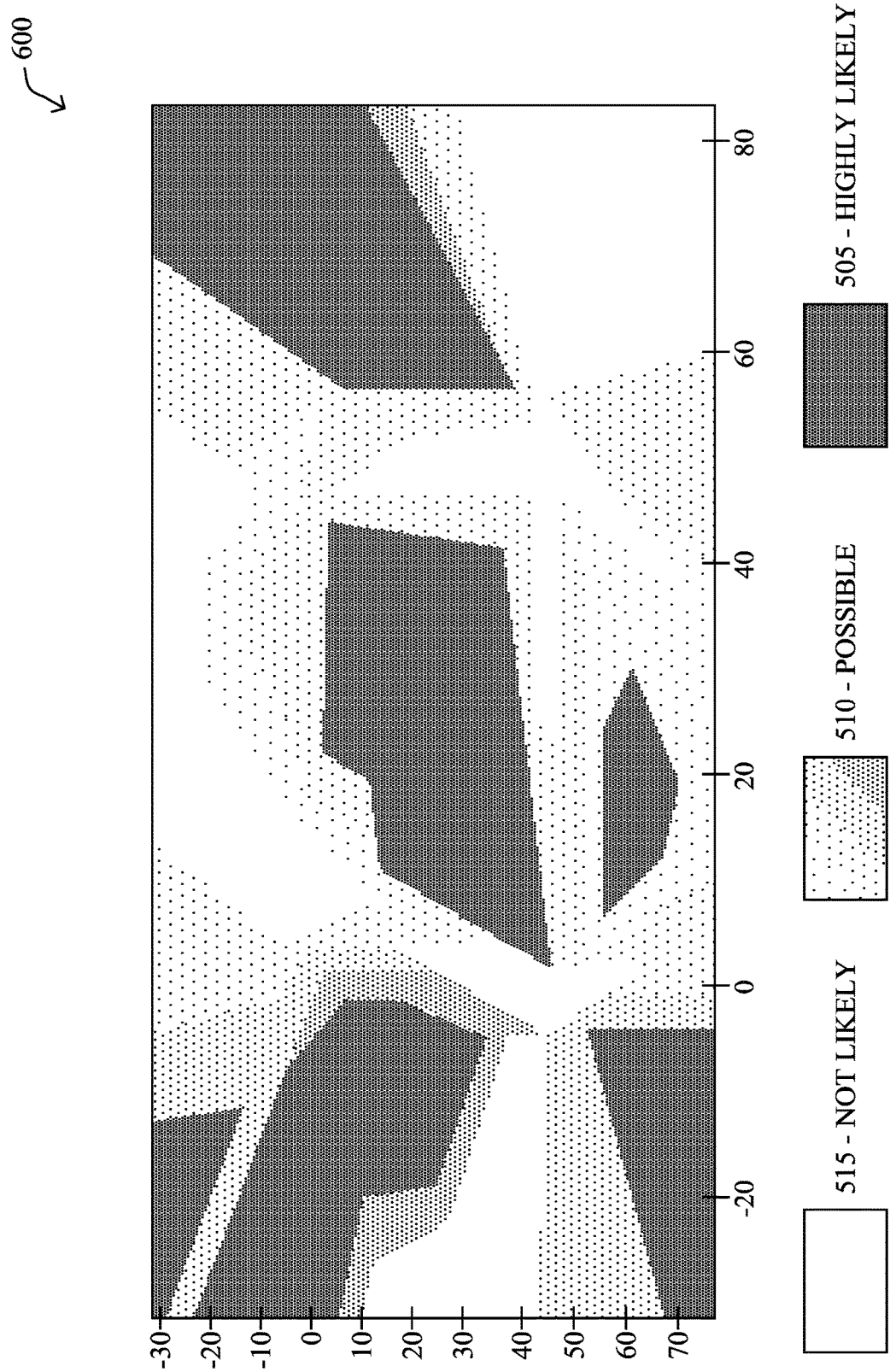
FIG. 6 illustrates another example probability heatmap for device location with one or more inaccurate measurements.

FIG. 5 illustrates an example of a probability heatmap 500 of where a particular device could be on the floor, where lighter shading (505) indicates a highly likely location of the device 108 within a space (with varying degrees of possible 510, not likely 515, and any granular shading in between). Notably, the probability heatmap 500 shows a generally "clean" location measurement, where there is not much ambiguity about where the device 108 is located. However, some location estimates are better than others, i.e., producing more accurate location estimates than others. Very commonly, a bad measurement taken at one AP can contribute to the composite heatmap (from all APs) to turn the heatmap 500 of FIG. 5 into the heatmap 600 of FIG. 6. Specifically, heatmap 600 shows a poor location estimation due to one or more APs contributing a poor measurement, which may be due to multipath, bad polarization angle from the client, or other factors), and the device could be located in many spots.

In addition, current locationing designs treat every individual antenna at each AP equivalently. Generally, however, the derived parameters from each antenna are often not equally accurate, and certain antennas may have more of a line-of-sight (LOS) component or stronger RSSI than others, and should thus be able to provide better information for a more accurate location estimate. Treating all antennas equally, as the technologies available today currently do, can thus further contribute to the AP-based locationing inaccuracies.

The techniques herein, therefore, apply machine learning techniques to determine which APs and/or antennas are contributing poorly to a location solution based on several factors (or "feature vectors"), and may either weight their contribution accordingly or remove it completely from consideration from the location solution, in order to thus be able to estimate location of a client with higher accuracy than can be done currently. In particular, identifying bad measurements is key to keeping location estimates accurate, and the techniques herein intelligently identify/remove APs/antennas that negatively impact accuracy. That is, the techniques herein are based on the observation that the location accuracy can be improved through removing or assigning reduced weights to "problematic" APs or antennas during locationing computations. At the same time, however, the relation between weights given to an AP/antenna is not necessarily a linear one when it comes to AoA or RSSI, and as such, certain embodiments of the techniques herein may further use a supervised machine learning framework to learn the non-linear relation between the weights given to different APs/antennas and the data derived from them as they pertain to location accuracy.

Generally, according to one or more embodiments of the disclosure as described in detail below, a device obtains a machine learning model indicative of how to focus on particular location information from a plurality of radio frequency (RF) elements to provide an accurate location estimate of a wireless client based at least in part on angle-of-arrival information of the wireless client. When the device then obtains location information regarding the wireless client from the plurality of RF elements, it may apply the machine learning model to the location information regarding the wireless client to focus on particular location information of the location information from the plurality of RF elements. The device may then estimate a physical location of the wireless client based on focusing on the particular location information during a locationing computation. In one embodiment, the RF elements comprise access points, and in one embodiment, the location information comprises locational probability heatmaps. In one embodiment, focusing on the particular location information during a locationing computation comprises excluding location information from certain access points. In another embodiment, the RF elements comprise antennas of access points, and in one embodiment, focusing on the particular location information during a locationing computation comprises weighting location information from certain antennas of certain access points to define a level of influence of the location information from certain antennas to the locationing computation.

Illustratively, the techniques described herein may be performed by hardware, software, and/or firmware, such as in accordance with the locationing process 248, which may include computer executable instructions executed by the processor 220 (or independent processor of interfaces 210) to perform functions relating to the techniques described herein.

Operationally, the techniques herein are first directed to effectively excluding APs from any given location solution by training a deep Neural-Network using the AP heatmaps as the feature vectors. The deep network then utilizes forward propagation for probabilistic estimation to determine whether the measurement that was taken at the AP should be included in the overall location solution or it should be discarded.

In particular, as mentioned above, in hyperlocation, typically a plurality of APs, e.g., often four or five, observe a device transmission and attempt to determine the location via a combination of RSSI, AoA, and time-based location techniques. However, since multipath, non-omnidirectional beampatterns, and polarization on the device and other impairments make it hard to predict whether any given AP amongst those four or five available APs will contribute to the overall location solution in a positive way. If the solution is hardcoded to use all of the APs in the solution, it typically underperforms (e.g., probability heatmap 600 above) relative to choosing the best N of M APs to determine the solution (e.g., probability heatmap 500 above). The techniques herein thus provide an efficient algorithm for determining, through machine learning, the best combination of APs, notably on a per measurement basis.

For example, if there are four APs, there are eleven possible combinations of two or more APs that one could find an XY location solution with:

possible combinations={[1,2],[1,3],[1,4],[2,3], . . . [1,2,3],[1,2,4],[1,2,3,4]}.

Figure 7:
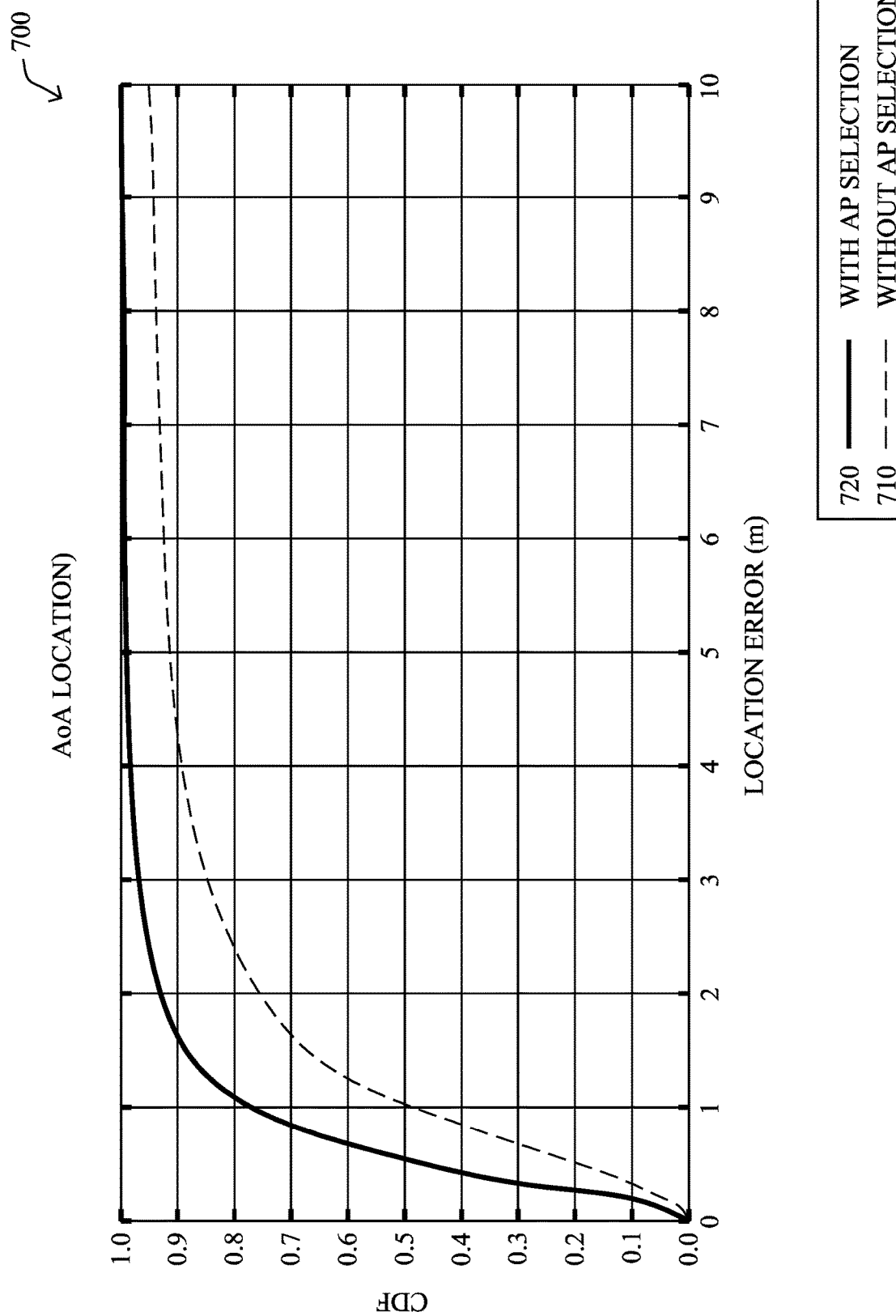
FIG. 7 illustrates an example comparison of location error based on angle-of-arrival locationing using all available access points or only accurate access points.

Finding the best combination of APs to obtain the solution can produce much better location results statistically than simply using all APs where certain of the APs are producing inaccurate (or "dirty") results. FIG. 7 illustrates an example graph 700 demonstrating the cumulative distribution function (CDF) of location error for four APs (dashed line 710) or a best combination of at least two APs of the four (solid line 720). (Note that AP selection (curve 720) is one way of grouping antennas (by treating all antennas of the same AP equivalently, while treating different APs separately), but as described below, antennas can also be grouped in a different way, or treated separately for finer granularity.)

In order to find the best combination of APs to use for each location computation, the techniques herein learn how to remove the APs which will contribute negatively towards the overall location accuracy for any given measurement, thereby resulting in a significant improvement to the overall location solution. In general, the removal of inaccurate APs begins with the standard procedure understood in the art to generate probability heatmaps, namely:

Capture AoA raw data at each AP from a device uplink frame;

Create the per AP probability heatmap of location of device;

Combine probability heatmaps of multiple APs to find composite heatmap and XY solution;

Capture AoA raw data at each AP from a device uplink frame; and

Create the per AP probability heatmap of location of device.

In particular, each AP has a phase measurement at each antenna that is captured anytime that AP receives a Physical Layer Convergence Procedure (PLCP) Protocol Data Unit (PPDU) from any station (STA), i.e., wireless device. This creates a vector of phases that corresponds to a probability heatmap of the transmitting STA's XY location per the wave equation (which is explicitly calculated herein and is a linear second-order partial differential equation which describes the propagation of oscillations at a fixed speed). Each AP's measurement/heatmap contributes independently to a composite/aggregate heatmap for all APs (e.g., heatmap 600) from the reception of a STA transmission (Tx). The techniques herein are thus poised to determine which AP(s) to exclude from and include in creation of this composite heatmap (for finding the XY location for any single STA given such measurements).

In one particular embodiment, the techniques herein take the heatmaps from each AP and determine if each AP should be included in the composite heatmap calculation from the per-AP probability heatmaps alone. The model is trained from data taken with known XY locations (described below), and the model learns which per-AP heatmaps have characteristics that should be included in and excluded from the composite heatmap solution.

Notably, the feature vectors themselves would be the probability heatmaps discussed above. These are matrices with values between 0 and 1 (or they could be any arbitrary range) that represent the probability of a STA being somewhere within a given area (e.g., on a floor map). This vector can be subsampled in certain embodiments in order to avoid very large feature vectors. Though one embodiment uses a heatmap in cartesian coordinates, the techniques herein could also be performed in polar coordinates as well (which is notably more consistent with AoA-type location).

Figure 8:
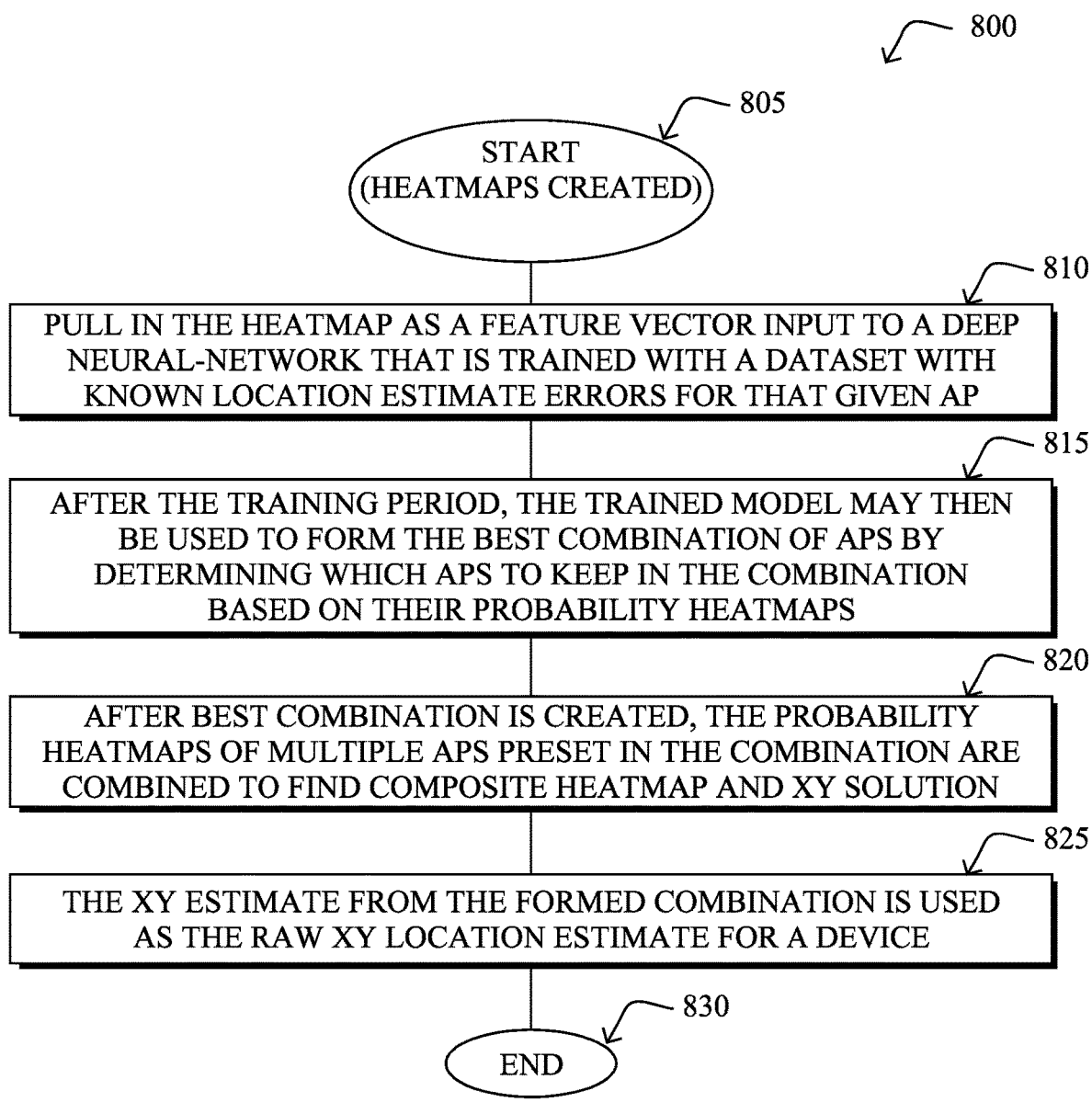
FIG. 8 illustrates an example simplified procedure for access point selection.

According to the techniques described herein, and with reference generally to the flowchart 800 of FIG. 8, which starts in step 805 following the heatmap creation process above, the embodiments herein pull in the heatmap as a feature vector input to a deep Neural-Network in step 810 that is trained with a dataset with known location estimate errors for that given AP. That is, following the heatmap creation, the heatmaps may be used as a feature vector input to a multi layered Artificial Neural-Network (ANN). Notably, the training may be performed using a software application having a location-based user interface and location accuracy test tool, such as the Connected Mobile Experiences (CMX) application available from Cisco Systems, Inc.

Figure 9:
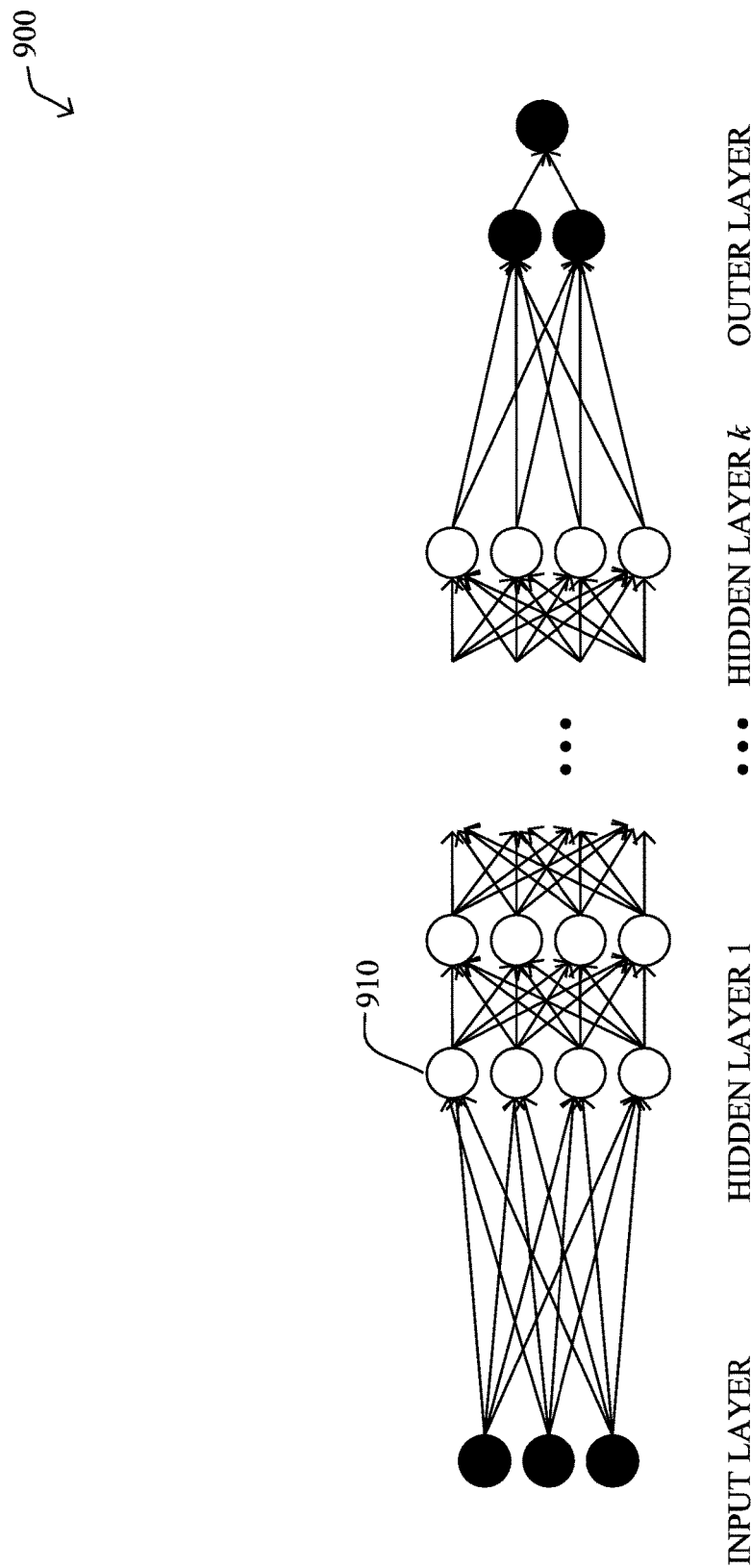
FIG. 9 illustrates an example of a simplified Artificial Neural-Network (ANN)

The deep Neural-Network model herein, such as the ANN 900 illustrated in simplified form in FIG. 9, utilizes forward-propagation (e.g., mini-batch Gradient Descent Deep Neural Network using forward-propagation) for probabilistic class estimations and back-propagation for parametric adjustment via gradient descent. Each neuron 910 in the model is based on a logistic regression approach along with a suitable activation function. Notably, activation functions that may be used are ReLUs (Rectified Linear Units) for the hidden layers (1 to k) and Sigmoid for the output layer. For further optimizations, L2 Regularization (to avoid high-variance/overfitting) and Adam Optimization (smoother training on mini batches) may also be used. Note also that a multi-layered perceptron model is efficient in finding relation between different features as every input layer feature is interconnected with every hidden layer feature, which helps in providing a better separation between multiple high probability regions on the AP probability heatmap. (Note that the use of neural networks alleviates the burden of processing the very large number of feature vectors (e.g., 288 minimum) over a large dataset.) Hyperparameters such as the learning rate, number of iterations, and the number of hidden layers may be kept constant to achieve a fixed training rate. However, many of the other hyperparameters are tunable and take values based on the training set. In one example, the following hyperparameters may be set:

Number of Hidden layers: 7;
Number of iterations: 5,000;
Adam weight variables: Moment-1: 0.9, Moment-2: 0.999;
Mini batch size: 64; and
Learning rate: 0.00065.

The classifier can then identify, for any given measurement, if a certain AP will be suitable to keep in the combination list or not in order to produce the best location accuracy for that measurement.

(Notably, the techniques herein illustratively use a non-parametric statistical pattern recognition model such as a support vector machine (SVM), k-nearest neighbor (KNN), and an initial feature extraction technique like Principle Component Analysis (PCA) or Singular Value Decomposition (SVD) may be required.)

Returning to FIG. 8, after the training period, the trained model may then be used in step 815 to form the best combination of APs by determining which APs to keep in the combination based on their probability heatmaps. That is, the ANN decides to keep or drop the AP from a combination list based on the heatmap input, such that when similar measurements are encountered in the future, the model will indicate which APs to drop/keep in the calculation of location.

For instance, APs that should be excluded have heatmaps that look a certain way for a given environment. For example, in one environment, there may be an AP that always has one beam that is pointing in some direction due to multipath, but also has another beam that is pointing at the right place, but that is weaker than the other beam sometimes—so the algorithm should include this AP. Or another scenario where the AP will have a single clear beam with a single direction when it is "good" and many beams in different directions when bad—thus the algorithm should exclude this AP only when it has many beams. Alternatively, the ANN may be configured instead to include all of the other AP heatmaps to determine if a particular AP's heatmap is accurate (that is, instead of looking at them each independently). For example, the heatmaps of AP2-N could help determine if the heatmap for AP1 should be included, such as where one AP has a heatmap that is pointing in a different direction than all of the other APs, it should probably be excluded, etc.

The techniques herein thus rely on the deep learning described above to figure this out for any particular physical environment, since the characteristics of a "good" and "bad" AP can be difficult to identify and also change with the environment. Notably, a minimum of two APs that are "good" are required for a location solution to be successful (per typical AoA use).

After the best combination is created, then in step 820 the probability heatmaps of multiple APs preset in the combination are combined to find a composite heatmap and XY solution. Then, in step 825, the XY estimate from the formed combination is used as the raw XY location estimate for a device, and the procedure 800 ends in step 830.

Figure 10:
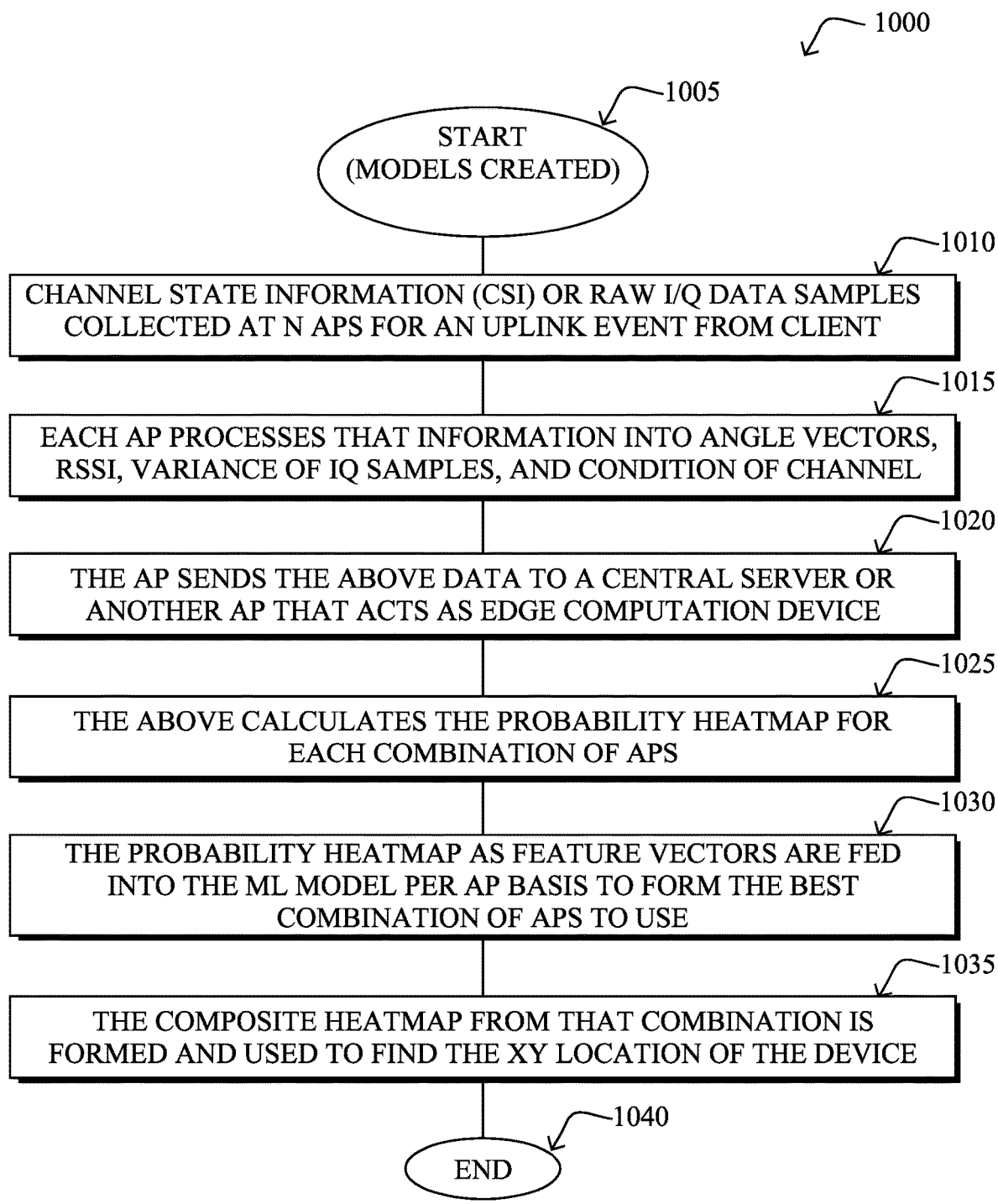
FIG. 10 illustrates an example simplified procedure for locationing of devices in the field based on access point selection.

In greater detail of the workflow for locationing of devices in the field based on AP selection, in particular, FIG. 10 illustrates an additional flowchart 1000 that starts in step 1005 with the models created above in training (FIG. 8). Illustratively, in step 1010, channel state information (CSI) or raw I/Q data (amplitude modulation and phase changes) samples are collected at N APs for an uplink event from a client device 108. Each AP processes that information in step 815 into angle vectors, RSSI, variance of IQ samples, and a condition number of the channel. Each AP then sends this data to a central server 112 or another AP that acts as an edge computation device in step 1020. The server or responsible AP then calculates the probability heatmap for each combination of APs in step 1025, where the probability heatmap as feature vectors are fed into the ML model per AP basis in step 1030 to form the best combination of APs to use. As such, in step 1035, the composite heatmap from that combination is formed and used to find the XY location of the device, and the procedure to locate a particular device ends in step 1040.

To demonstrate the utility of a neural network, a single-layer neural net consisting of 10 neurons was used to generate a confusion matrix for the training, validation, and testing sets, as shown in FIG. 11. The input used consisted of the probability heatmaps obtained for the same AP from three different clients for fifty different location settings at four different orientations. The data was divided as:

Training set: 70%
Validation set: 15%
Testing set: 15%

On running the model, the confusion matrices in FIG. 11 were obtained, namely the training confusion matrix 1110, the validation confusion matrix 1120, the test confusion matric 1130. As shown, the overall accuracy ("all confusion matrix" 1140) using just a single-layered Neural Network came out to be 88.6%.

In addition, according to one or more further aspects of the embodiments herein, the techniques herein may further (or alternatively) improve location accuracy by assigning different weights/posterior probabilities to different antennas of grouped APs, or, in one embodiment, to APs as a whole. In particular, the techniques herein provide a supervised machine learning framework (e.g., an ANN) to learn the non-linear relation between the weights given to different antennas and the signal features (e.g., RSSI value, AoA phase value, signal variation, noise floor (NF), etc.) derived from them as they pertain to location accuracy, in the grouped APs.

Figure 4:
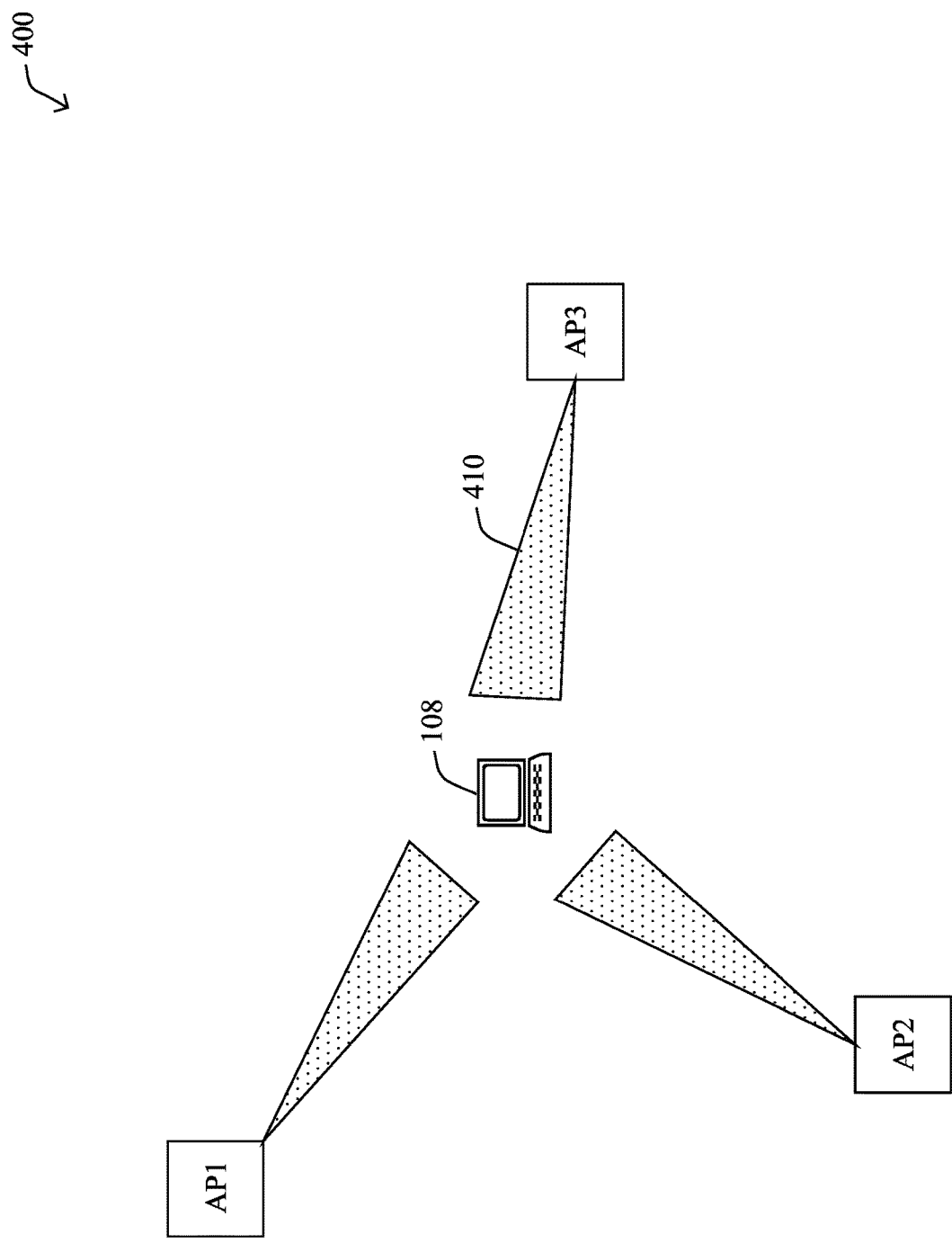
FIG. 4 illustrates an example angle-of-arrival computation for locating a device.
Figure 12A:
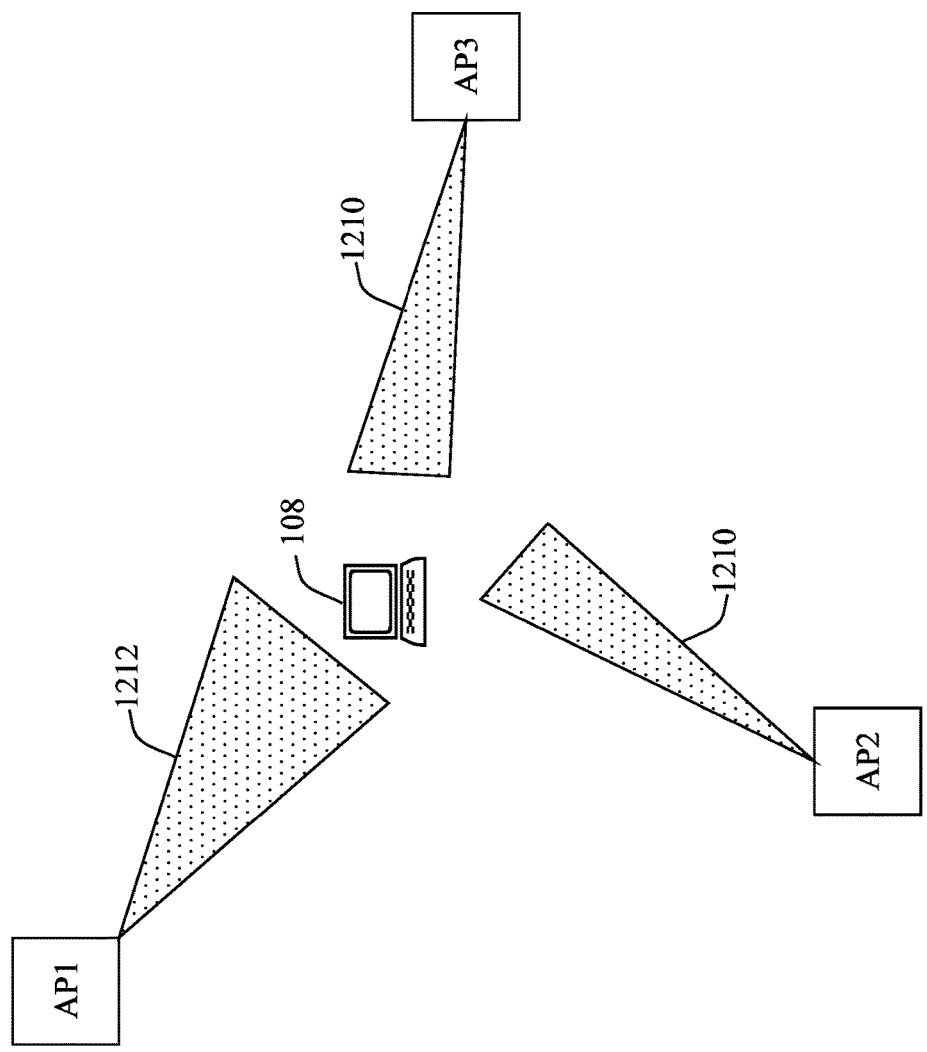
FIGS. 12A-12B illustrate examples of cases where antenna weighting can help to improve location accuracy.
Figure 12B:
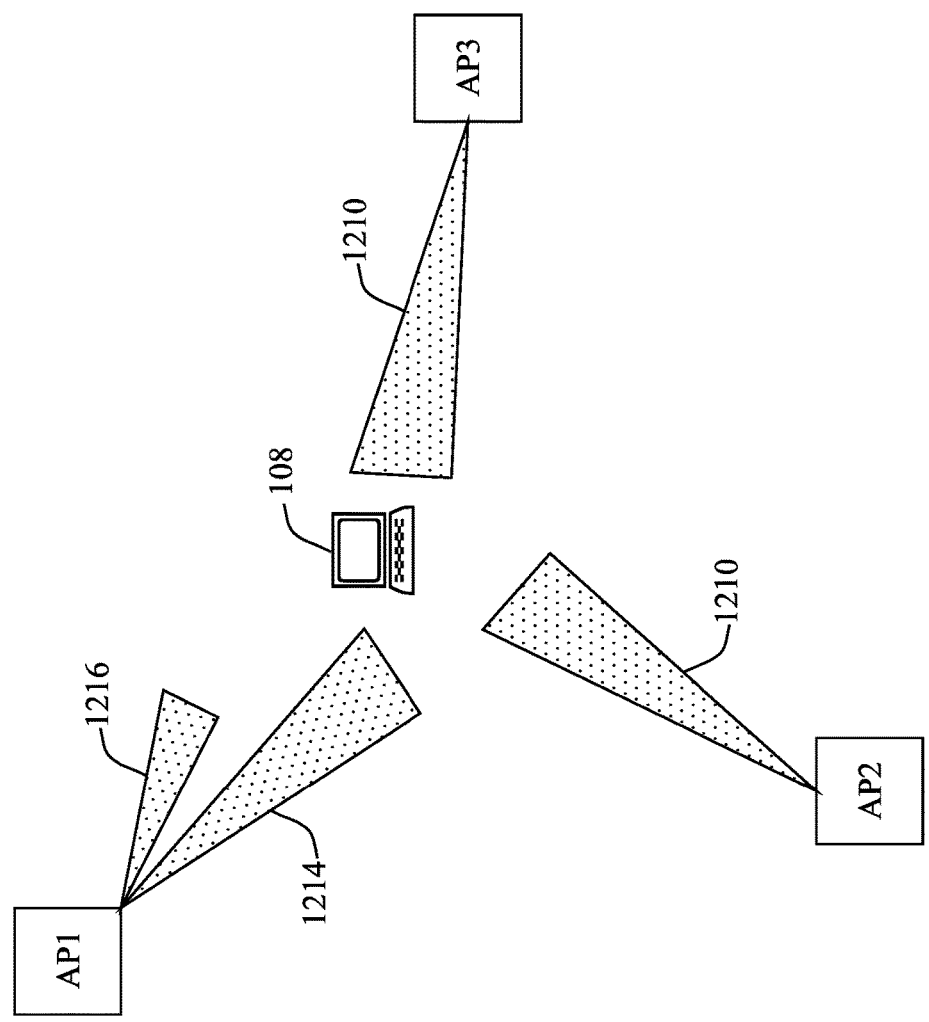

As can be observed in FIG. 4 above, current hyperlocation design treats all of the antennas at different APs (AP1, AP2, and AP3) equivalently. However, in certain cases, such as that shown in FIGS. 12A-12B, some APs (e.g., AP1 in this example) may have extra non-line-of-sight (NLOS) components (illustration 1202 of FIG. 12B, where AP1 has a wider estimate 1212 of location as compared to AP2's and AP3's more accurate/narrower estimates 1210), and assigning different weights to different antennas can improve location accuracy (illustration 1204 of FIG. 12B, where AP1 can now more strongly weight certain antennas with better accuracy, e.g., AoA estimate 1214, while applying less (or no) weight to less accurate estimates, e.g., estimate 1216). A main reason that assigning different weights to different antennas can work is that the NLOS components become uncorrelated over half a wavelength distance which is just several centimeters between antennas.

The techniques herein may thus be configured to assign different weights to different antennas during AoA location calculation in order to improve accuracy. As mentioned above (Eq. 3 above), each of the sixteen antennas at each AP can be treated equivalently during the correlation calculation, however, in order to improve accuracy, the techniques herein give them different weights based on machine learning, as described below. That is, by intelligently determining a weight vector, denoted herein as [W1, W2, . . . , W16], computing the following weight-based version of Eq. 3 above will lead to better location accuracy:

$$C=[\exp(j^*theta1), \exp(j^*theta2), \ldots, \exp(j^*theta16)]^*([W1^*\exp(j^*phi1),W2^*\exp(j^*phi2), \ldots, W16^*\exp(j^*phi16)]^\hat{}H \quad \text{(Eq. 4)}.$$

Notably, [W1, W2, . . . , W16] is the weight vector with sixteen different weights for one AP, and there are different weight vectors determined for different APs. (In contrast, in current hyperlocation techniques, W1=W2, . . . , W16=1 for all APs.)

According to the techniques herein, a supervised machine learning framework is designed to learn the non-linear relation between the weights given to different antennas and the data derived from them as they pertain to location accuracy, in the grouped APs. The goal of the weighting is to be able to estimate location of a client with higher accuracy than what can be performed without the weighting.

The machine learning framework can use linear or non-linear non-parametric supervised classifiers, however, Artificial Neural Networks (ANN) have been known to provide direct estimation of the posterior probabilities for the relation between inputs and outputs while often fitting the training data very well and, thus, have low bias in their classification. An ANN for a classification problem can be viewed as a mapping function, F: Rd→Rf, where a d-dimensional input is submitted to the network and then an f-vectored network output is obtained to make the classification decision. Since this is quite applicable to the techniques described herein, a trained Multi-Layer Perceptron with sigmoidal activation function for each unit is illustratively used as an example to compute the weights of different antennas.

For example, in order to compute the antenna weights, the techniques herein may use Feed-Forward Artificial Neural Networks (FFANNs). The inputs are the features of signals of each antenna of the grouped APs (as discussed below), while the outputs are the weights for all antennas of the grouped APs. FFANNs have been known to provide direct estimation of the posterior probabilities for the non-linear relation between inputs and outputs, while often fitting the training data very well and, thus, have low bias in their estimation. Supervised training FFANNs have been shown to estimate many non-linear models in various communications system design problems including polynomial models, Volterra models, and Wiener-Hammerstein models. The Multi-Layer Perceptron with sigmoidal activation function for each unit can thus be used to act as a non-linear mapping estimator, mapping the feature set of all antennas to the weighting vector associated with the antennas, for computing the most accurate location. It has been shown that the use of two hidden layers have been sufficient in estimating arbitrary non-linear functions of the input. While the use of additional hidden layers beyond two can help with learning complex representations (e.g., face recognition, object recognition, etc.), it is likely that the location estimation problem herein need not warrant many more layers than two (though more layers are, of course, optional embodiments of the present disclosure). In general, an optimized number of hidden neurons should be ⅔ the size of the input layer, plus the size of the output layer, though this number can be adjusted slightly up or down with different training scenarios.

Figure 13:
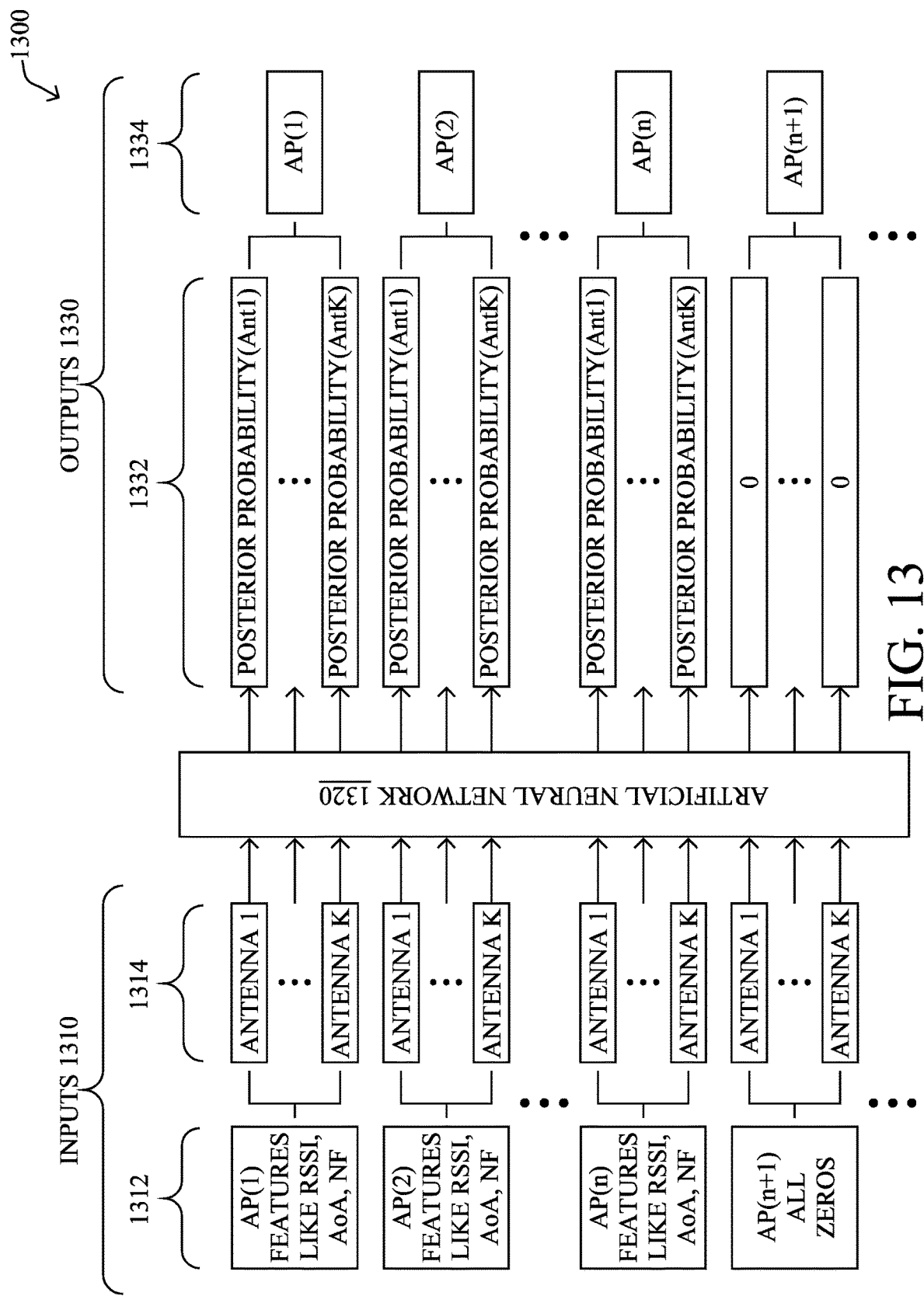
FIG. 13 illustrates an example of an Artificial Neural Network used to derive the weights for different antennas at access points.

As shown in the machine learning environment 1300 of FIG. 13, the inputs 1310 into the ANN 1320 are features of signals at different antennas 1314 for different APs 1312. For example, as shown, for antennas of AP(1) to AP(n), the techniques herein may use RSSI value, AoA phase value, signal variation, noise floor (NF), etc. For the other APs such as AP(n+1), because they may not receive signals from the client (one reason is that they are not included in the AP group for the target client), the corresponding inputs are all zeros.

Notably, in regard to building feature vectors, in general, the techniques herein use input features to the FFANN that are relevant in determining the weight of each antenna in the outcome of AoA location. As noted above, a main reason that assigning different weights to different antennas is feasible is that the Non-Line-of-Sight components become uncorrelated over half a wavelength distance which is the minimum distance between antennas. The FFANN estimates the non-linear function that maps the features as parameters to arrive at the weight vector. The feature vector input to the FFANN may be comprised of any one or more of the following inputs:

Delay spread/coherence bandwidth per antenna: Delay spread/coherence bandwidth of the channel is a bell weather for the degree of multi-path of received signals. Thus a less multi-path prone transmission would have a smaller delay spread/larger coherence bandwidth at the receiver. One method to compute the coherence bandwidth is to first remove phase slope in frequency(caused by non-perfect start-of-packet detection) and then directly compare elements across frequency for each individual antenna. Another method to compute delay spread is to first remove phase slope in frequency and then convert to time domain and look at number of samples the decay occurs over.

Coherence time per antenna: Time coherence of the channel per antenna (i.e., Doppler Shift) is also relevant to location computation. When the client is moving or when there is mobility in the environment, the degree of Doppler Shift will be different with different antennas. In such a scenario, the antennas with smaller Doppler Shift should be given a higher weight, because they provide a more stable channel estimation (i.e., more immune to environment variation/client mobility). Coherence time can be computed by per antenna channel estimation of the same client over time. Moreover, location accuracy tests can be conducted even if the client is moving (thereby knowing the client's true location). Thus it is viable to use this feature in both training and deployment.

AoA spectrum peak-to-average (pta) contribution of each antenna: When correlating the received AoA phase vector of each AP to the ideal phase vectors over azimuth (e.g., with elevation angle fixed to 0), the techniques herein prefer an AoA spectrum which has larger peak-to-average value, as it indicates a stronger degree of line-of-sight. Therefore, if computing pta to be the normalized peak-to-average of all sixteen antennas of an AP, and pta_i to be the normalized peak-to-average of all fifteen antennas except antenna i of the AP, pta_i/pta(which is referred to as the "AoA spectrum peak-to-average contribution of antenna i") reflects the degree of line-of-sight of signals received by antenna i.

RSSI per antenna: This is akin to the power of the signal. A line-of-sight signal usually has a higher RSSI compared to a reflected one and therefore is preferred in the weighting of the antenna.

Noise floor per antenna: A higher noise floor indicates that the signals of the corresponding antenna contributes to more errors of the location calculation.

The outputs 1330 of the ANN 1320 are the weights/posterior probabilities 1332 of each antenna (Ant1-AntK) for each AP 1334, which would mean that in the location calculation, RSSI value and AoA phase value associated with the antennas are weighted accordingly. In one embodiment, in order to ease the complexity of finding training exemplars, the techniques herein could use the posterior probabilities assigned by ANN along with a predetermined threshold value to decide where or not to use the antenna data at all (i.e., 0 or 1 rather than a weight). Another embodiment may involve computing different weights for AoA and RSSI values of the same antenna at each AP. In still another embodiment, when an entire AP is removed from consideration, such as in accordance with the techniques described above, all of the weights of the corresponding antennas may be set to 0, accordingly.

Figure 14:
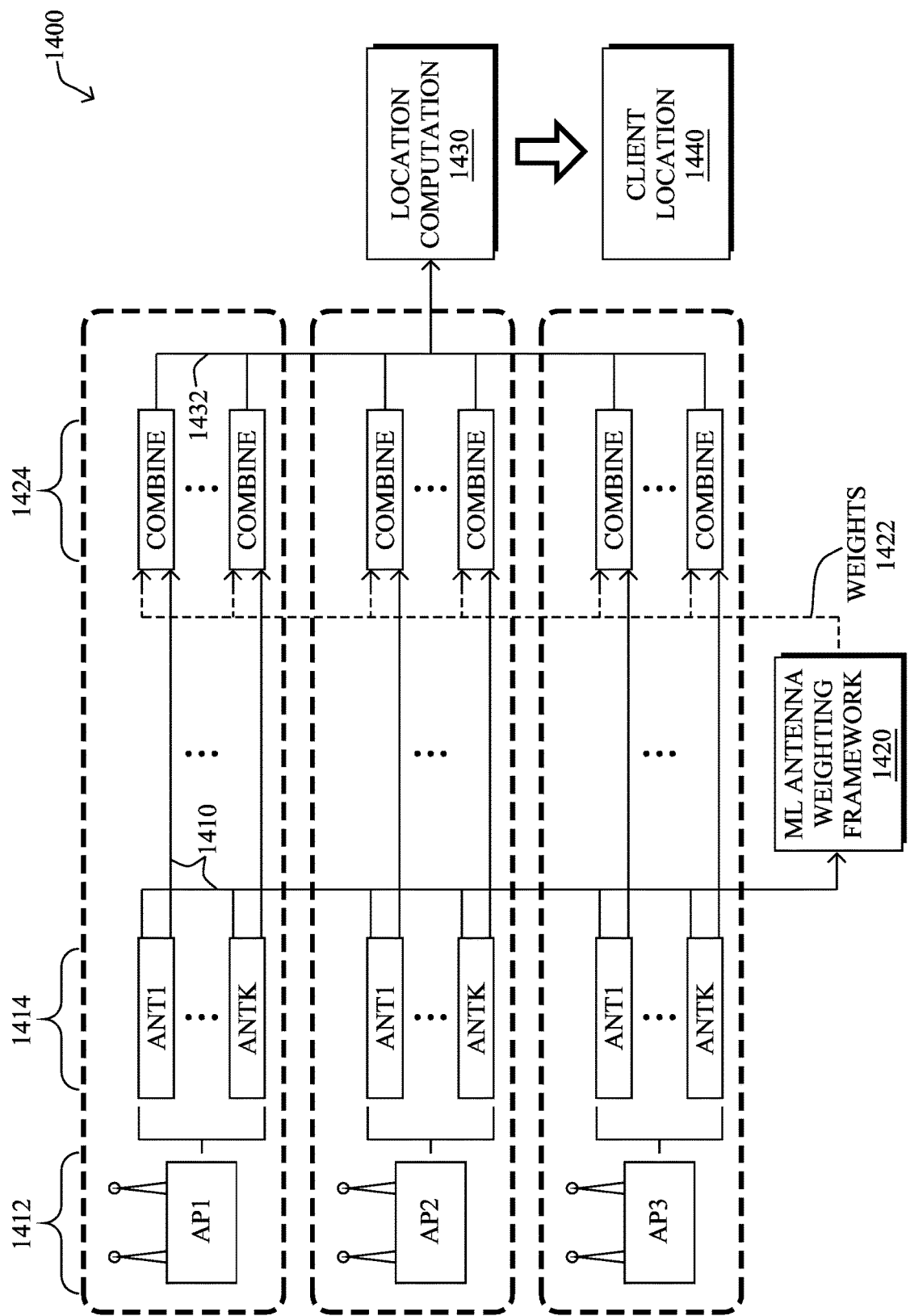
FIG. 14 illustrates an example of using weights/posterior probabilities to improve location computation accuracy.

After the above computation (and after training is finished), as shown in computation 1400 of FIG. 14, the techniques herein can now input the signal features 1410 of each antenna 1414 of each AP 1412 into the ML antenna weighting framework 1420, where the ML outputs the weights/posterior probabilities 1422, which are used ("combined with"—operation 1424) to weight the RSSI and AoA phase values of different antennas as they get input as weighted values 1432 into the location calculations unit 1430. The location calculation is then performed in the same manner as current hyperlocation algorithms, just now with the weighted inputs in order to determine a more accurate client location 1440, accordingly.

Notably, increasing the number of the antennas per AP could substantially scale the exhaustive search for the "optimal" binary weights as more and more antennas are added to APs. Accordingly, in one embodiment, the techniques herein would first determine the APs which would provide the most accurate location (described above), and then the exhaustive search for the "optimal" binary weight vector for antennas of those APs can be conducted on the reduced overall set (reducing the complexity of the search substantially). In another embodiment, heuristic iterative optimization algorithms may also be used to find the best weights off line. In the end the optimized weight vector for each location would be used to train the ANN using back propagation given the input vector extracted from pertinent APs.

A noteworthy point with regard to the scaling of the large number of antennas is that the training of the Multilayer Perceptron (MLP) for a large input vector can become very complex and slow converging even off-line, that is why in yet another embodiment, the techniques may use a Convolutional Neural Network Architecture with deep learning once the location has more than three APs, since the first layer of the ANN, through convolutional filters, reduces the dimensionality of the input (the large input dimension is mapped to a smaller dimension) for eventual MLP weight classification problem.

Figure 15:
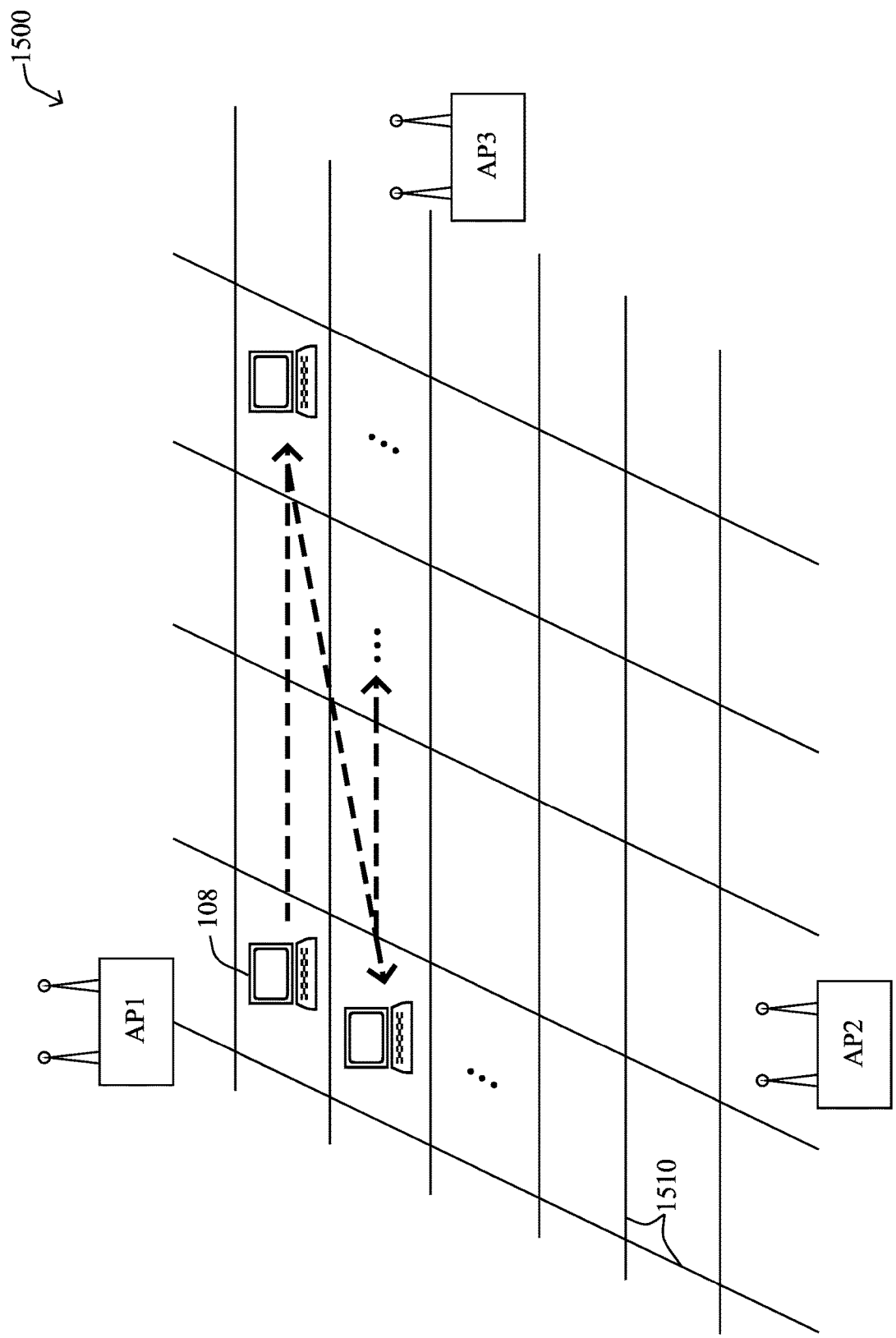
FIG. 15 illustrates an example of a supervised training process of the Artificial Neural Network.

FIG. 15 illustrates an example 1500 of a supervised training process of the ANN according to one or more embodiments of the present disclosure that can be used to collect "exemplars" (training data set) to train the ANN. As shown in FIG. 15, in an off-line session, the techniques herein are able to measure the true location of a client 108 within the area of operation of a plurality of APs, such as AP1, AP2, and AP3 based on knowing the location of the device 108 when each measurement is made. That is, for each position within the space 1500, the AoA and RSSI readings from all APs antennas for the client transmission may be collected, and the techniques herein can determine the best set of APs/antennas and/or weight values that would provide the closest estimated location to the measured ground truth. The procedure may then be repeated by moving the client to different (predetermined) locations within the area of operation. Note that it may be beneficial to divide the area 1500 in to a grid 1510, then using the centers of the squares in the grid as the chosen location for client to be placed for the purpose of gathering training data. Generally, the training data set are collected with a diverse set of client true locations, AP layout, and wireless environment to prevent over-fitting.

Figure 16A:
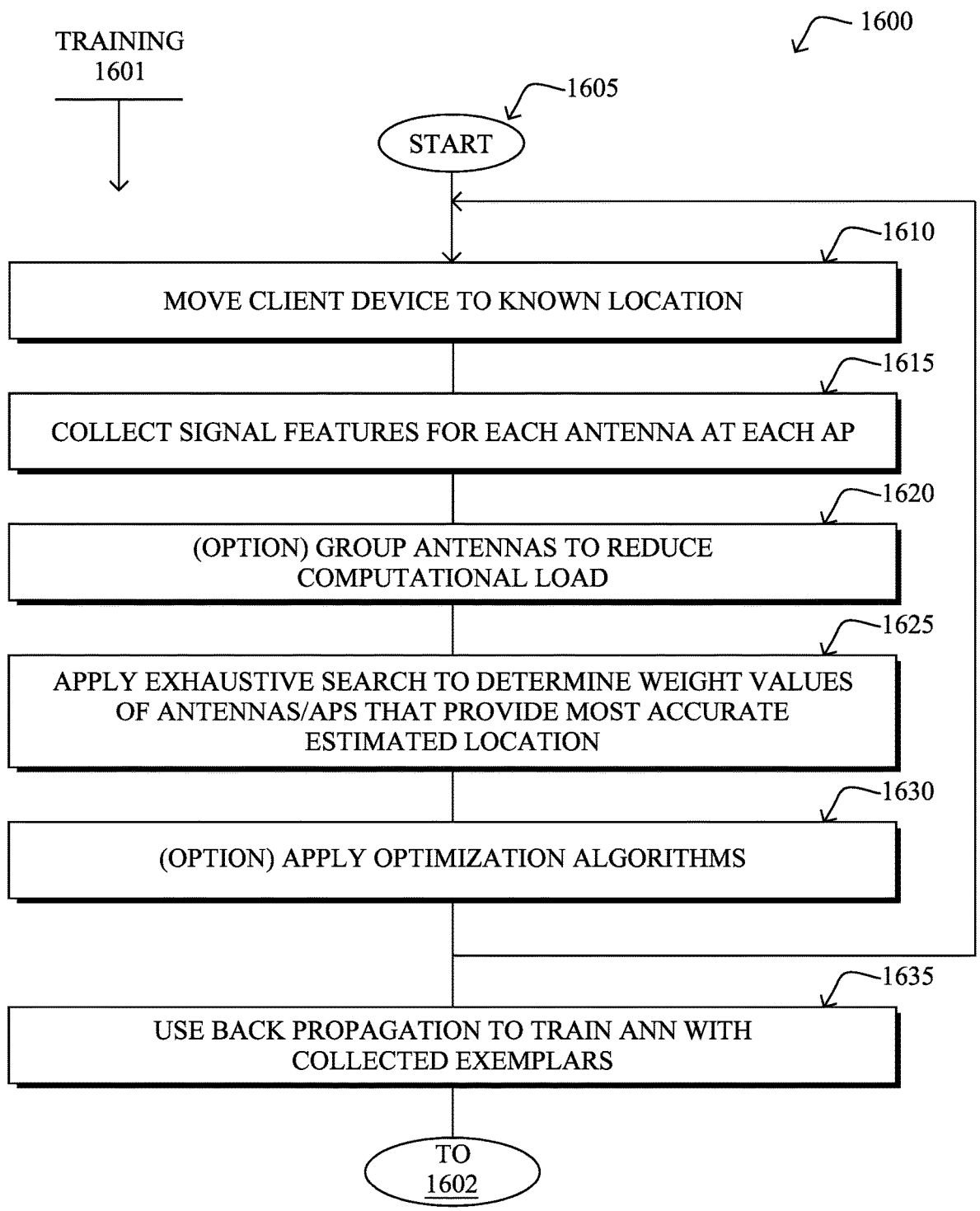
FIGS. 16A-16B illustrate an example simplified procedure for determining which antennas should be weighted more than others through a training phase and deployment phase.
Figure 16B:
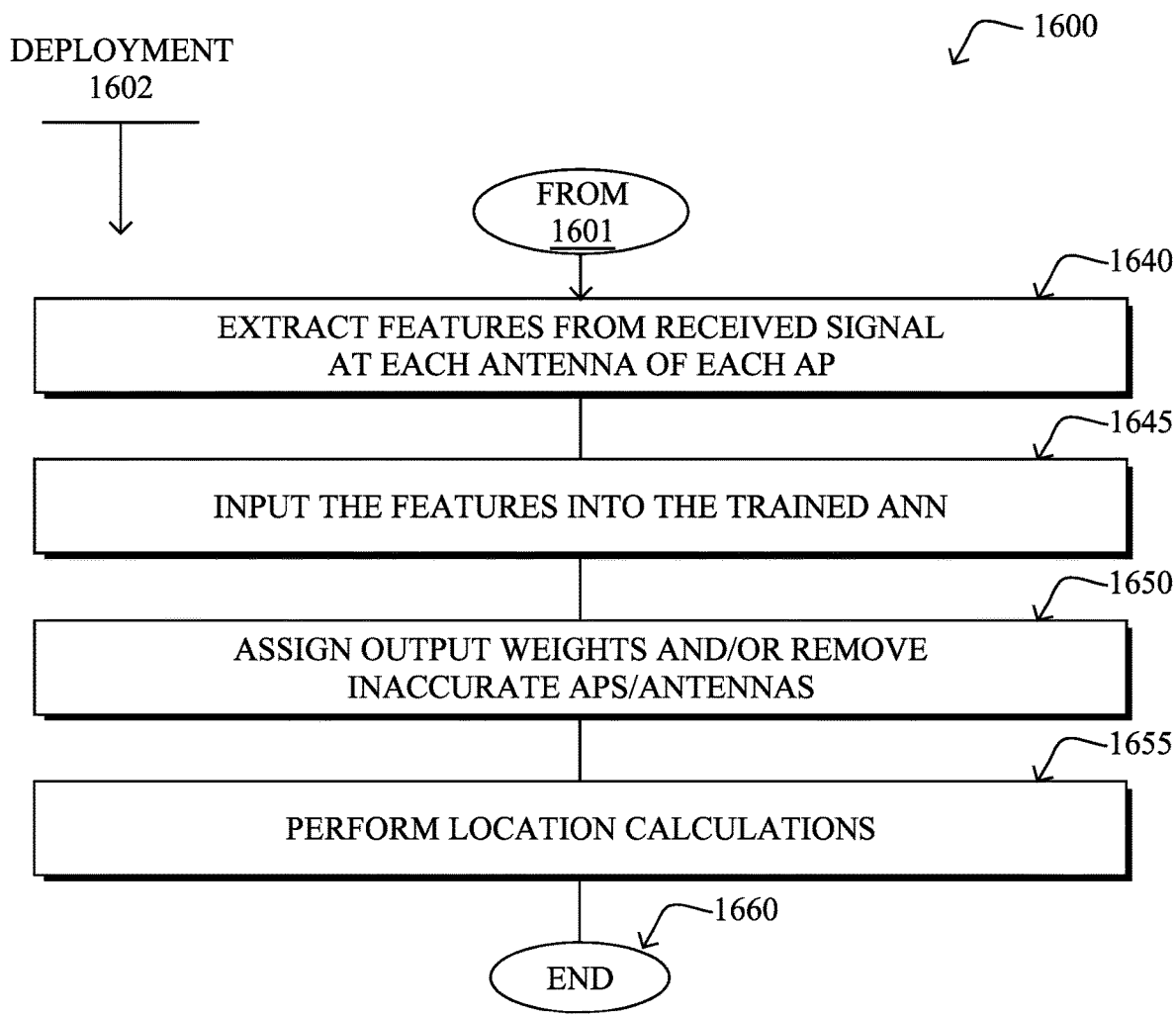

In greater detail, FIGS. 16A-16B illustrate a simplified example procedure 1600 for determining which antennas or APs should be weighted more than others, or included at all, during the locationing calculations herein. Generally, the techniques herein are divided into a training phase 1601 (FIG. 16A) and a deployment phase 1602 (FIG. 16B), and start in step 1605. In particular, as illustrated in FIG. 15, the exemplars are collected with known locations of the client device. As specifically shown in FIG. 16A (training phase 1601) the techniques herein move a client device to multiple pre-determined locations in step 1610 and collect the signal features discussed above for each antenna at every AP in step 1615. Because the true location of the client is already known (which can be done even if the client is moving), the following steps can be used to determine the weights for different APs/antennas, including weights of zero to remove an antenna/AP from consideration, in order to compute a location that is closest to the actual location:

- 1620: To reduce the computational load of the exhaustive search in step 1625 below, the techniques herein can first group antennas into different groups and assign all zeros or ones to all antennas in the same group (i.e., antennas in one group have the same weight). The grouping can be done per AP, per several APs, or per sub-antenna-array on each AP.
- 1625: As noted, an exhaustive search is applied to determine the binary weight values of antennas that would give us the most accurate estimated location. That is, weight "0" indicates that this/these antenna(s) are not used, while weight "1" indicates that this/these antenna(s) are used.
- 1630: As a further option, the techniques herein can use heuristic iterative optimization algorithms to find a sub-optimal weight vector for the antennas. In this case, the antennas can have continuous weights (e.g., any real number from 0 to 1) compared to the binary ones in 1620 and 1625. The techniques herein may illustratively begin the optimization computation by selecting a random starting point in the weight space (i.e., some random weight vectors for all grouped APs), and use algorithms such as Steepest Descent to search for the local optima. Because the optimization in terms of antenna weights is highly non-convex, the techniques herein may select multiple random starting points, repeat the optimization searching process, and compare the derived local optimas. However, because the algorithm begins with multiple different random initial weight vectors, this optimization process may take long time. For this reason, step 1630 may be configured for use during training only, and FFANNs may be used instead for deployment.

After the exemplars are collected (from the device moved throughout multiple known locations), then in step 1635 the training phase may use back propagation to train the FFANNs, accordingly, for use in the deployment phase 1602 as in FIG. 16B.

In particular, after training, during deployment the techniques herein first extract the features discussed above for each antenna of each AP in step 1640, and then input them into the FFANN in step 1645. The output weights (binary or continuous) are then assigned to the antennas/APs in step 1650 before location calculations are made in step 1655, accordingly. The illustrative locationing procedure 1600 (thus deployment phase 1602 as well) illustratively ends in step 1660 with an accurately located device according to the techniques herein.

It is important to note that the techniques herein are not selecting which AP/antenna to exclude for all grid points (i.e., the techniques herein are not "all or nothing"). Rather, the techniques herein are directed to a measurement-by-measurement determination of whether a particular antenna or AP is "good" or "bad" for the accuracy of estimating a device location. In other words, the techniques herein are not attempting to determine a set of parameters to follow for a certain location (e.g., "within this area, always ignore this AP/antenna"), but are instead attempting to take any set of measurements, and apply them to a machine learning model to determine which APs and/or antennas to focus on for the locationing determination (e.g., "when measurements look like this, determine device location based input focused like this"). As mentioned above, this "focus" may involve AP selection (which APs to include/exclude), antenna weighting (which antennas are better for certain measurements/locations), grouped antenna selection (e.g., weighting all antennas from a group at zero), AP weighting (e.g., for these measurements, the impact of one or more APs' input vectors can be reduced), and so on.

Figure 17:
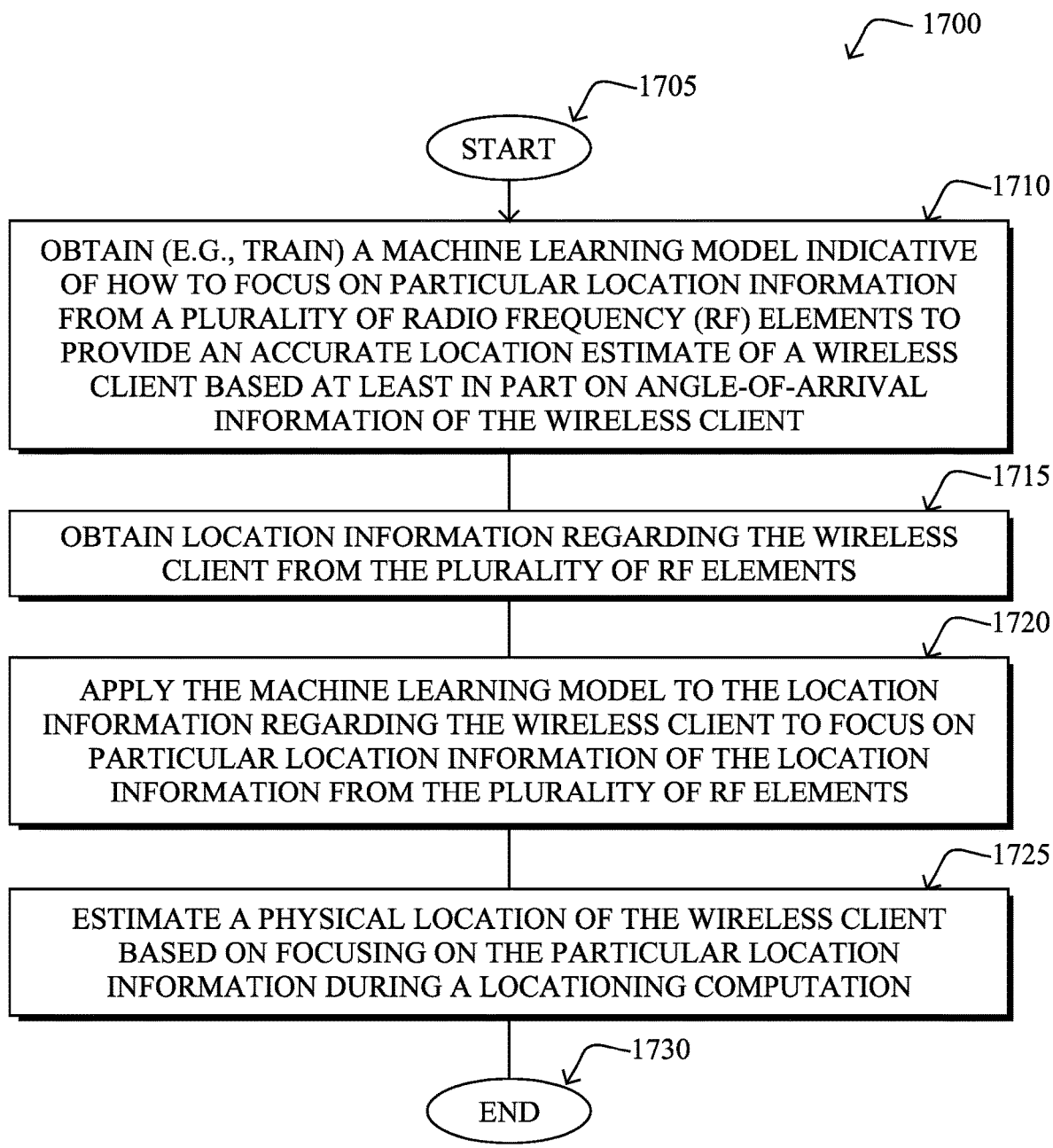
FIG. 17 illustrates an example simplified procedure for enhancing the accuracy of angle-of-arrival device locating through machine learning.

In this manner, FIG. 17 illustrates an example simplified procedure for enhancing the accuracy of angle-of-arrival device locating through machine learning in accordance with one or more embodiments described herein. For example, a non-generic, specifically configured device (e.g., device 200, such as a location services server 112 or configured access point) may perform procedure 1700 by executing stored instructions (e.g., process 248). The procedure 1700 may start at step 1705, and continues to step 1710, where, as described in greater detail above, the device obtains a machine learning model (e.g., based on an artificial neural network (ANN)) indicative of how to "focus" on particular location information from a plurality of radio frequency (RF) elements to provide an accurate location estimate of a wireless client based at least in part on angle-of-arrival information of the wireless client. Notably, as mentioned above, obtaining the model may generally comprise training the machine learning model based on location information regarding one or more wireless clients in known locations.

In step 1715, the device may obtain location information regarding the wireless client from the plurality of RF elements (e.g., in deployment), where the location information is based on angle-of-arrival information and one or more values selected from RSSI, angle-of-arrival phase value, signal variation, noise floor, variance of samples, and channel condition.

The device may then apply the machine learning model to the location information regarding the wireless client in step 1720 in order to focus on particular location information of the location information from the plurality of RF elements. As such, in step 1725, the device may estimate a physical location of the wireless client based on focusing on the particular location information during a locationing computation.

Notably, in one embodiment, the RF elements comprise access points, and in one further embodiment, the location information comprises locational probability heatmaps. As described above, focusing on the particular location information during a locationing computation may thus comprise excluding location information from certain access points.

Conversely, the RF elements may also comprise antennas of access points in one embodiment, and focusing on the particular location information during a locationing computation may thus comprise weighting location information from certain antennas of certain access points to define a level of influence of the location information from certain antennas to the locationing computation. (Note that in one embodiment, weighting is binary to either include or exclude particular location information, while in another embodiment, weighting is within a range from zero to a maximum weight value.)

In still further embodiments herein focusing on the particular location information during a locationing computation may comprise various combinations or alternatives, such as, e.g., including location information from only certain access points and weighting location information from certain antennas of those included certain access points to define a level of influence of the location information from certain antennas to the locationing computation. Still other embodiments involve weighting APs' location information, or excluding antennas' location information. Grouping of antennas may also be performed, such that those groups of antennas may have the same weight or may all be excluded (or included) as a group.

The illustrative simplified procedure 1700 may then end in step 1730.

It should be noted that while certain steps within procedures 800, 1000, 1600, and 1700 may be optional as described above, the steps shown in FIGS. 8, 10, 16A-16B, and 17 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 800, 1000, 1600 and 1700 are described separately, certain steps from each procedure may be incorporated into each other procedure, and the procedures are not meant to be mutually exclusive.

The techniques described herein, therefore, enhance the accuracy of angle-of-arrival device locating through machine learning. In particular, in one embodiment, the techniques herein use probability heatmaps as feature vectors in machine learning models in order to determine the best sub combination of APs and/or antennas for an AoA-based location solution (i.e., identifying APs to exclude from the solution). In another embodiment, the techniques herein weigh individual antennas of APs or of APs in entirety in order to improve accuracy. That is, the techniques herein consider multiple antennas at multiple APs and additional features such as angle-of-arrival rather than just RSSI. Notably, unlike other locationing technologies, the techniques herein are not burdened with attempting to reconstruct data for non-selected antennas/APs, nor with establishing any "fingerprinting maps" based on full-area surveys or other techniques performed in advance.

While there have been shown and described illustrative embodiments that provide for enhancing the accuracy of angle-of-arrival device locating through machine learning, it is to be understood that various other adaptations and modifications may be made within the spirit and scope of the embodiments herein. For example, while certain embodiments are described herein with respect to using certain machine learning models, the models are not limited as such and others may be used as appropriate in other embodiments. In addition, while certain protocols are shown, such as 802.11, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   obtaining, at a device, a machine learning model indicative of how to focus on particular location information from a plurality of radio frequency (RF) elements to provide a location estimate of a wireless client based at least in part on angle-of-arrival information of the wireless client;
   obtaining, at the device, location information regarding the wireless client from the plurality of RF elements;
   applying, by the device, the machine learning model to the location information regarding the wireless client to focus on particular location information of the location information from the plurality of RF elements, wherein focusing the particular location information includes:
      weighting location information from certain antennas of certain access points to define a level of influence of the location information from certain antennas to the locationing; and
   estimating, by the device, a physical location of the wireless client based on the focusing on the particular location information during a locationing computation.

2. The method as in claim 1, wherein the location information comprises locational probability heatmaps.

3. The method as in claim 1, wherein obtaining the machine learning model comprises:
   training the machine learning model based on location information regarding one or more wireless clients in known locations.

4. The method as in claim 1, wherein focusing on the particular location information during a locationing computation comprises:
   excluding location information from certain access points.

5. The method as in claim 1, wherein weighting is binary to either include or exclude particular location information.

6. The method as in claim 1, wherein weighting is within a range from zero to a maximum weight value.

7. The method as in claim 1, wherein the location information is based on angle-of-arrival information and one or more values selected from a group consisting of: received signal strength indication (RSSI), angle-of-arrival phase value, signal variation, noise floor, variance of samples, and channel condition.

8. The method as in claim 1, wherein focusing on the particular location information during a locationing computation comprises:
   including location information from only certain access points; and
   weighting location information from certain antennas of those included certain access points to define a level of influence of the location information from certain antennas to the locationing computation.

9. The method as in claim 1, wherein the machine learning model is based on an artificial neural network (ANN).

10. A tangible, non-transitory, computer-readable medium storing program instructions that cause a computer to execute a process comprising:
    obtaining a machine learning model indicative of how to focus on particular location information from a plurality of radio frequency (RF) elements to provide a location estimate of a wireless client based at least in part on angle-of-arrival information of the wireless client;
    obtaining location information regarding the wireless client from the plurality of RF elements;
    applying the machine learning model to the location information regarding the wireless client to focus on particular location information of the location information from the plurality of RF elements, wherein focusing the particular location information includes:

weighting location information from certain antennas of certain access points to define a level of influence of the location information from certain antennas to the locationing; and estimating a physical location of the wireless client based on the focusing on the particular location information during a locationing computation.

11. The computer-readable medium as in claim 10, wherein focusing on the particular location information during a locationing computation comprises:

excluding location information from certain access points.

12. An apparatus, comprising:

one or more network interfaces to communicate with a network;

a processor coupled to the network interfaces and configured to execute one or more processes; and a memory configured to store a process executable by the processor, the process, when executed, configured to:

obtain a machine learning model indicative of how to focus on particular location information from a plurality of radio frequency (RF) elements to provide a location estimate of a wireless client based at least in part on angle-of-arrival information of the wireless client;

obtain location information regarding the wireless client from the plurality of RF elements;

apply the machine learning model to the location information regarding the wireless client to focus on particular location information of the location information from the plurality of RF elements, wherein focusing the particular location information includes:

weighting location information from certain antennas of certain access points to define a level of influence of the location information from certain antennas to the locationing; and estimate a physical location of the wireless client based on the focusing on the particular location information during a locationing computation.

13. The apparatus as in claim 12, wherein focusing on the particular location information during a locationing computation comprises excluding location information from certain access points.

14. The apparatus as in claim 12, wherein weighting is binary to either include or exclude particular location information.

* * * * *